US012707469B2

(12) United States Patent
Ma et al.

(10) Patent No.: US 12,707,469 B2
(45) Date of Patent: Aug. 11, 2026

(54) FREQUENCY HOPPING PATTERNS FOR PUCCH BEFORE DEDICATED CONFIGURATION

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Bharat Shrestha, San Diego, CA (US); Changhwan Park, San Diego, CA (US); Ayan Sengupta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/499,639

(22) Filed: Nov. 1, 2023

(65) Prior Publication Data

US 2024/0155616 A1 May 9, 2024

Related U.S. Application Data

(60) Provisional application No. 63/382,357, filed on Nov. 4, 2022.

(51) Int. Cl.
*H04W 72/04* (2023.01)
*H04L 1/1812* (2023.01)
(Continued)

(52) U.S. Cl.
CPC .......... *H04W 72/21* (2023.01); *H04L 5/0012* (2013.01)

(58) Field of Classification Search
CPC ... H04L 5/001; H04L 5/0012; H04L 27/2601; H04L 5/0053; H04L 5/0094;
(Continued)

(56) References Cited

U.S. PATENT DOCUMENTS 11,601,160 B2 * 3/2023 Matsumura .......... H04W 72/21
11,838,132 B2 * 12/2023 Yeo .................... H04L 1/1812
(Continued)

FOREIGN PATENT DOCUMENTS

WO 2022/215016 A1 10/2022

OTHER PUBLICATIONS

International Search Report and Written Opinion dated Mar. 13, 2024 from corresponding PCT Application No. PCT/US2023/078562.

*Primary Examiner* — Edan Orgad
*Assistant Examiner* — Vanneilian Lalchinthang
(74) *Attorney, Agent, or Firm* — ArentFox Schiff, LLP

(57) ABSTRACT

Aspects are provided for enhancing a physical uplink control channel PUCCH) with frequency hopping for PUCCH repetition prior to dedicated PUCCH resource configuration. For example, the PUCCH may carry a HARQ ACK for Message 4 or Message B. An apparatus such as a user equipment (UE) receives an indication that a cell supports an enhanced physical uplink control channel (PUCCH) frequency hopping pattern for PUCCH with repetition prior to dedicated PUCCH resource configuration. The UE indicates at least one of a capability or a request of the UE for the enhanced PUCCH frequency hopping pattern. The UE receives downlink control signaling that indicates whether the enhanced PUCCH frequency hopping pattern is configured. The UE transmits a PUCCH with repetition and frequency hopping based on whether the enhanced PUCCH frequency hopping pattern is configured.

18 Claims, 13 Drawing Sheets

(51) Int. Cl.
*H04L 5/00* (2006.01)
*H04W 56/00* (2009.01)
*H04W 72/21* (2023.01)

(58) Field of Classification Search
CPC ..... H04L 1/1812; H04L 1/1671; H04B 1/713; H04B 1/7143; H04W 8/22; H04W 8/24; H04W 72/21; H04W 72/23
USPC ........................................................... 370/330
See application file for complete search history.

(56) References Cited

U.S. PATENT DOCUMENTS

| | | | | |
|---|---|---|---|---|
| 11,985,663 | B2 * | 5/2024 | Yu | H04W 72/23 |
| 2020/0221506 | A1 * | 7/2020 | Jeon | H04W 74/0808 |
| 2021/0050980 | A1 * | 2/2021 | Baldemair | H04L 5/0053 |
| 2021/0100004 | A1 * | 4/2021 | Yang | H04L 27/2607 |
| 2021/0195653 | A1 | 6/2021 | Lei et al. | |
| 2021/0195654 | A1 * | 6/2021 | Lei | H04W 72/21 |
| 2022/0239417 | A1 * | 7/2022 | Cheng | H04L 1/1835 |
| 2022/0295576 | A1 * | 9/2022 | Cirik | H04W 74/08 |
| 2023/0091961 | A1 * | 3/2023 | Atkins | D01F 9/15 |
| 2023/0262708 | A1 * | 8/2023 | Golitschek Edler von Elbwart | H04W 72/21 370/329 |
| 2024/0195591 | A1 * | 6/2024 | Mozaffari | H04L 5/0012 |
| 2025/0227740 | A1 * | 7/2025 | Wu | H04W 8/24 |

* cited by examiner

300
One Frame (TDD)
10 ms
subframe
RB
slot
D D D D D D D D D D D D F U
subcarrier
OFDM symbol
slot
DMRS R
CSI-RS
330
PDCCH
SSS
PSS
PDSCH
PBCH
BWP
BWP
20 RBs
SS/PBCH Block
channel bandwidth RBs
350
One Frame (TDD)
10 ms
subframe
RB
slot
D F U U U U U U U U U U U U
subcarrier
OFDM symbol
slot
SRS
SRS Comb 0
SRS Comb 1
DMRS R
380
PUCCH
PUSCH

FREQUENCY HOPPING PATTERNS FOR PUCCH BEFORE DEDICATED CONFIGURATION

CROSS-REFERENCE TO RELATED APPLICATIONS

This application claims priority to U.S. Provisional Application No. 63/382,357 titled "FREQUENCY HOPPING PATTERNS FOR PUCCH BEFORE DEDICATED CONFIGURATION," filed Nov. 4, 2022, which is assigned to the assignee hereof, and incorporated herein by reference in its entirety.

TECHNICAL FIELD

This disclosure relates generally to wireless communication, and more specifically, to techniques for inter-slot frequency hopping for physical uplink control channel (PUCCH) before a dedicated configuration.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus for wireless communication. The apparatus includes one or more memories and one or more processors coupled to the one or more memories. The one or more processors are, individually or in combination, configured to receive an indication that a cell supports an enhanced physical uplink control channel (PUCCH) frequency hopping pattern for PUCCH with repetition prior to dedicated PUCCH resource configuration. The one or more processors are, individually or in combination, configured to indicate at least one of a capability or a request of the UE for the enhanced PUCCH frequency hopping pattern. The one or more processors are, individually or in combination, configured to receive downlink control signaling that indicates whether the enhanced PUCCH frequency hopping pattern is configured. The one or more processors are, individually or in combination, configured to transmit a PUCCH with repetition and frequency hopping based on whether the enhanced PUCCH frequency hopping pattern is configured.

A further aspect of the subject matter described in this disclosure can be implemented in an apparatus for wireless communication. The apparatus includes one or more memories and one or more processors coupled to the one or more memories. The one or more processors are, individually or in combination, configured to indicate that a cell supports an enhanced physical uplink control channel (PUCCH) frequency hopping pattern for PUCCH with repetition prior to dedicated PUCCH resource configuration. The one or more processors are, individually or in combination, configured to receive an indication of at least one of a capability or a request of a user equipment (UE) for the enhanced PUCCH frequency hopping pattern. The one or more processors are, individually or in combination, configured to transmit downlink control signaling that indicates whether the enhanced PUCCH frequency hopping pattern is configured. The one or more processors are, individually or in combination, configured to receive a PUCCH with repetition and frequency hopping based on whether the enhanced PUCCH frequency hopping pattern is configured.

Another further aspect of the subject matter described in this disclosure can be implemented in a method of wireless communication at a UE. The method includes receiving an indication that a cell supports an enhanced physical uplink control channel (PUCCH) frequency hopping pattern for PUCCH with repetition prior to dedicated PUCCH resource configuration. The method includes indicating at least one of a capability or a request of the UE for the enhanced PUCCH frequency hopping pattern. The method includes receiving downlink control signaling that indicates whether the enhanced PUCCH frequency hopping pattern is configured. The method includes transmitting a PUCCH with repetition and frequency hopping based on whether the enhanced PUCCH frequency hopping pattern is configured.

Another further aspect of the subject matter described in this disclosure can be implemented in a method of wireless communication at a base station. The method includes indicating that a cell supports an enhanced physical uplink control channel (PUCCH) frequency hopping pattern for PUCCH with repetition prior to dedicated PUCCH resource configuration. The method includes receiving an indication of at least one of a capability or a request of a user equipment (UE) for the enhanced PUCCH frequency hopping pattern. The method includes transmitting downlink control signaling that indicates whether the enhanced PUCCH frequency hopping pattern is configured. The method includes receiving a PUCCH with repetition and frequency hopping based on whether the enhanced PUCCH frequency hopping pattern is configured.

Another further aspect of the subject can be implemented in an apparatus for wireless communication. The apparatus includes means for receiving an indication that a cell supports an enhanced physical uplink control channel (PUCCH) frequency hopping pattern for PUCCH with repetition prior to dedicated PUCCH resource configuration. The apparatus includes means for indicating at least one of a capability or a request of the UE for the enhanced PUCCH frequency hopping pattern. The apparatus includes means for receiving downlink control signaling that indicates whether the enhanced PUCCH frequency hopping pattern is configured. The apparatus includes means for transmitting a PUCCH with repetition and frequency hopping based on whether the enhanced PUCCH frequency hopping pattern is configured.

Another further aspect of the subject can be implemented in an apparatus for wireless communication. The apparatus includes means for indicating that a cell supports an enhanced physical uplink control channel (PUCCH) frequency hopping pattern for PUCCH with repetition prior to dedicated PUCCH resource configuration. The apparatus further includes means for receiving an indication of at least one of a capability or a request of a user equipment (UE) for the enhanced PUCCH frequency hopping pattern. The apparatus further includes means for transmitting downlink control signaling that indicates whether the enhanced PUCCH frequency hopping pattern is configured. The apparatus further includes means for receiving a PUCCH with repetition and frequency hopping based on whether the enhanced PUCCH frequency hopping pattern is configured.

Another further aspect of the subject matter described in this disclosure can be implemented in a non-transitory computer-readable medium storing computer-executable code including stored instructions of communications, executable by a processor to: receive an indication that a cell supports an enhanced physical uplink control channel (PUCCH) frequency hopping pattern for PUCCH with repetition prior to dedicated PUCCH resource configuration; indicate at least one of a capability or a request of the UE for the enhanced PUCCH frequency hopping pattern; receive downlink control signaling that indicates whether the enhanced PUCCH frequency hopping pattern is configured; and transmit a PUCCH with repetition and frequency hopping based on whether the enhanced PUCCH frequency hopping pattern is configured.

Another further aspect of the subject matter described in this disclosure can be implemented in a non-transitory computer-readable medium storing computer-executable code, the code when executed by a processor cause the processor to: indicate that a cell supports an enhanced physical uplink control channel (PUCCH) frequency hopping pattern for PUCCH with repetition prior to dedicated PUCCH resource configuration; receive an indication of at least one of a capability or a request of a user equipment (UE) for the enhanced PUCCH frequency hopping pattern; transmit downlink control signaling that indicates whether the enhanced PUCCH frequency hopping pattern is configured; and receive a PUCCH with repetition and frequency hopping based on whether the enhanced PUCCH frequency hopping pattern is configured.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
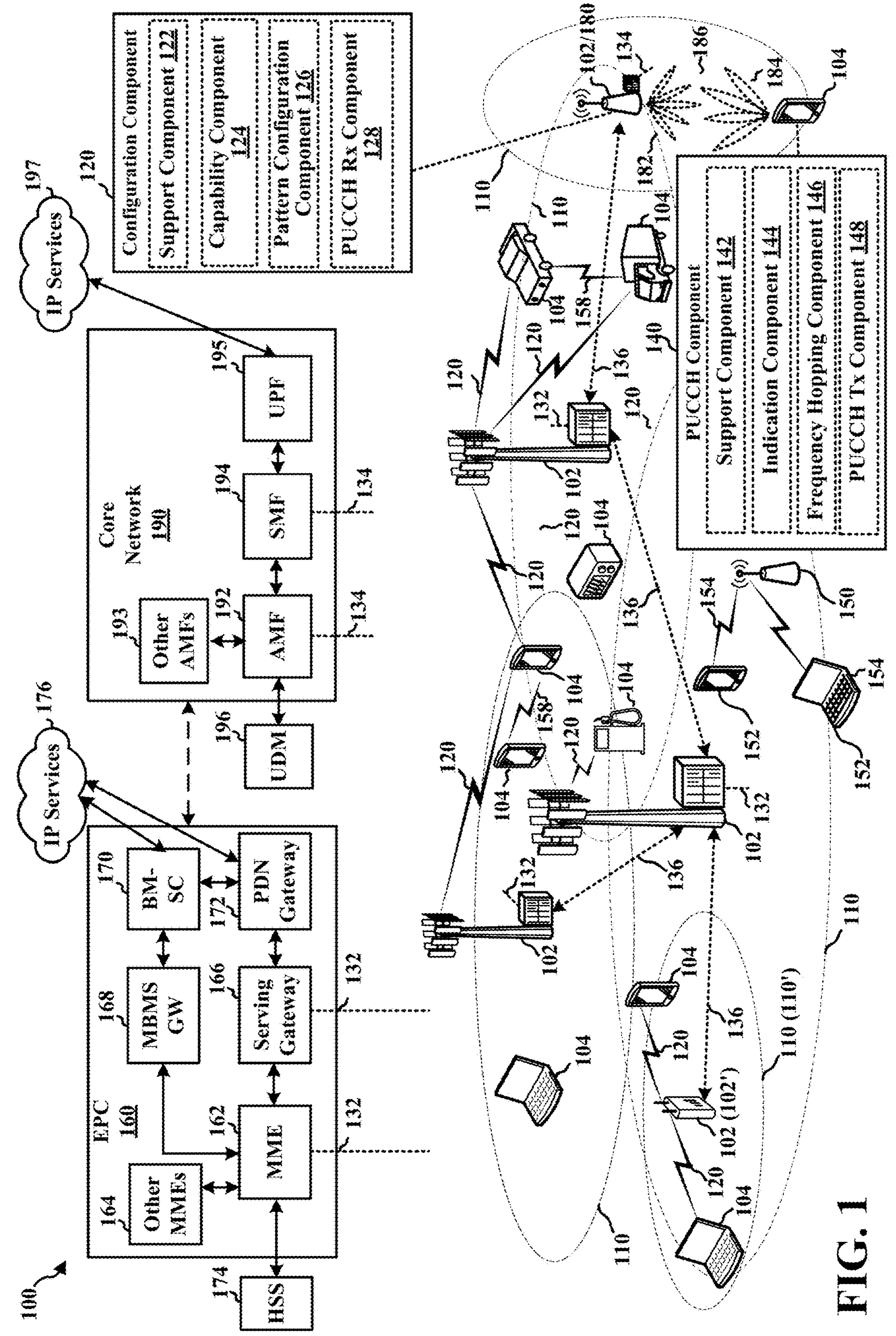
FIG. 1 is a diagram illustrating an example of a wireless communications system and an access network.

The following description is directed to some particular aspects for the purposes of describing innovative aspects of this disclosure. However, a person having ordinary skill in the art will readily recognize that the teachings herein can be applied in a multitude of different ways. The described aspects can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described aspects can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described aspects also can be implemented using other wireless communication protocols or RF signals suitable for use in one or more of a wireless personal area network (WPAN), a wireless local area network (WLAN), a wireless wide area network (WWAN), or an internet of things (JOT) network.

In non-terrestrial networks (NTN), there is a large distance between user equipment (UE) and receiver (e.g., satellite or base station) in satellite-based communication. A Hybrid Automatic Repeat Request (HARQ) Acknowledgement (ACK) may be sent in uplink on a Physical Uplink Control Channel (PUCCH). For example, a HARQ-ACK for a random access message 4 or message B may be transmitted before dedicated configuration for PUCCH. Accordingly, such a HARQ ACK may fail with a high probability due to the large distance and likely signal attenuation without a coverage enhancement such as repetition. Currently, for PUCCH before dedicated PUCCH resource configuration, there is no repetition associated with the PUCCH resource set or mechanisms to enhance the robustness of the message.

In order to improve coverage and reliability, coverage enhancement techniques may be applied to certain transmissions, such as a PUCCH transmission. Specifically, the coverage enhancement techniques may include repetition of a transmission for coverage extension because HARQ ACK cannot meet target requirements without repetition. For instance, after an initial access procedure, also referred to as a random access procedure, PUCCH may use repetitions of a PUCCH transmission to allow the receiver to connect and combine the PUCCH transmission data copies in the decoding of the HARQ ACK. However, the available HARQ-ACK PUCCH configuration may not be supported before random access is completed. In addition, there is currently no PUCCH repetition configuration associated with PUCCH transmissions such as HARQ ACK in response to Message 4 or Message B during random access procedures. Additionally, PUCCH transmissions generally utilize frequency hopping. With no dedicated configuration for PUCCH, a frequency hopping pattern may not be configured.

PUCCH repetitions may be supported when the PUCCH transmission is scheduled using dedicated PUCCH resources. Conventionally, PUCCH repetitions may not be supported when the PUCCH transmission is scheduled via a PUCCH resource set that is provided via system information (e.g., system information block 1 (SIB1)), as is the case for the HARQ-ACK transmission on PUCCH in response to Message 4 or Message B (i.e., PUCCH transmission during random access procedures). However, Message 4 HARQ ACK is sent in a PUCCH transmission before the dedicated PUCCH resource configuration and there is no repetition associated with the PUCCH resources set. Thus, it would be helpful if the performance of PUCCH carrying the HARQ ACK bit for Message 4 or Message B could be enhanced in coverage limited scenarios with repetition and/or a frequency hopping pattern.

As described in further detail in the present disclosure, PUCCH repetition according to a frequency hopping pattern may be performed to increase coverage extension during random access procedures. In particular, a UE may perform repetition on a PUCCH transmission that contains a HARQ-ACK feedback for a contention resolution PDSCH transmission in a random access procedure (e.g., Message 4 or Message B). Further, an enhanced frequency hopping pattern may be used prior to dedicated PUCCH configuration. The enhanced frequency hopping pattern may provide frequency diversity and allow demodulation reference signal (DMRS) bundling. The PUCCH transmission may then be transmitted on resources prior to activation of dedicated PUCCH resource configuration with repetition and an enhanced frequency hopping pattern.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells).

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In an aspect, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 112 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 112 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances, in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102 may operate in a traditional sub-6 GHz (or sub-7 GHz) spectrum, in mmW frequencies, and/or near-mmW frequencies in communication with the UE 104. When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 200 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

In an aspect, the UE 104 includes a PUCCH component 140 that is configured to transmit a PUCCH with an enhanced frequency hopping pattern prior to dedicated configuration. The PUCCH component 140 may include a support component 142 configured to determine that a cell supports an enhanced physical uplink control channel (PUCCH) frequency hopping pattern for PUCCH with repetition prior to dedicated PUCCH resource configuration. The PUCCH component 140 may include an indication component 144 configured to indicate at least one of a capability or a request of the UE for the enhanced PUCCH frequency hopping pattern. The PUCCH component 140 may include a frequency hopping component 146 configured to receive downlink control signaling that indicates whether the enhanced PUCCH frequency hopping pattern is configured. The PUCCH component 140 may include a PUCCH Tx component 148 configured to transmit a PUCCH with repetition and frequency hopping based on whether the enhanced PUCCH frequency hopping pattern is configured.

In an aspect, the base station 102/180 (e.g., network entity or a network node, such as a gNB) includes a configuration component 120 that is configured to receive a PUCCH with an enhanced frequency hopping pattern prior to dedicated configuration. The configuration component 120 may include a support component 122 configured to indicate that a cell supports an enhanced physical uplink control channel (PUCCH) frequency hopping pattern for PUCCH with repetition prior to dedicated PUCCH resource configuration. In some aspects, the PUCCH with repetition may carry the HARQ ACK bit (the value of which may be ACK only, or one selected from ACK and NACK) for a PDSCH, which may be a message 4 or message B during random access, or a PDSCH other than message 4 or message B. The configuration component 120 may include a capability component 124 configured to receive an indication of at least one of a capability or a request of a user equipment (UE) for the enhanced PUCCH frequency hopping pattern. The configuration component 120 may include a pattern configuration component 126 configured to transmit downlink control signaling that indicates whether the enhanced PUCCH frequency hopping pattern is configured. The configuration component 120 may include a PUCCH Rx component 128 configured to receive a PUCCH with repetition and frequency hopping based on whether the enhanced PUCCH frequency hopping pattern is configured.

Figure 2:
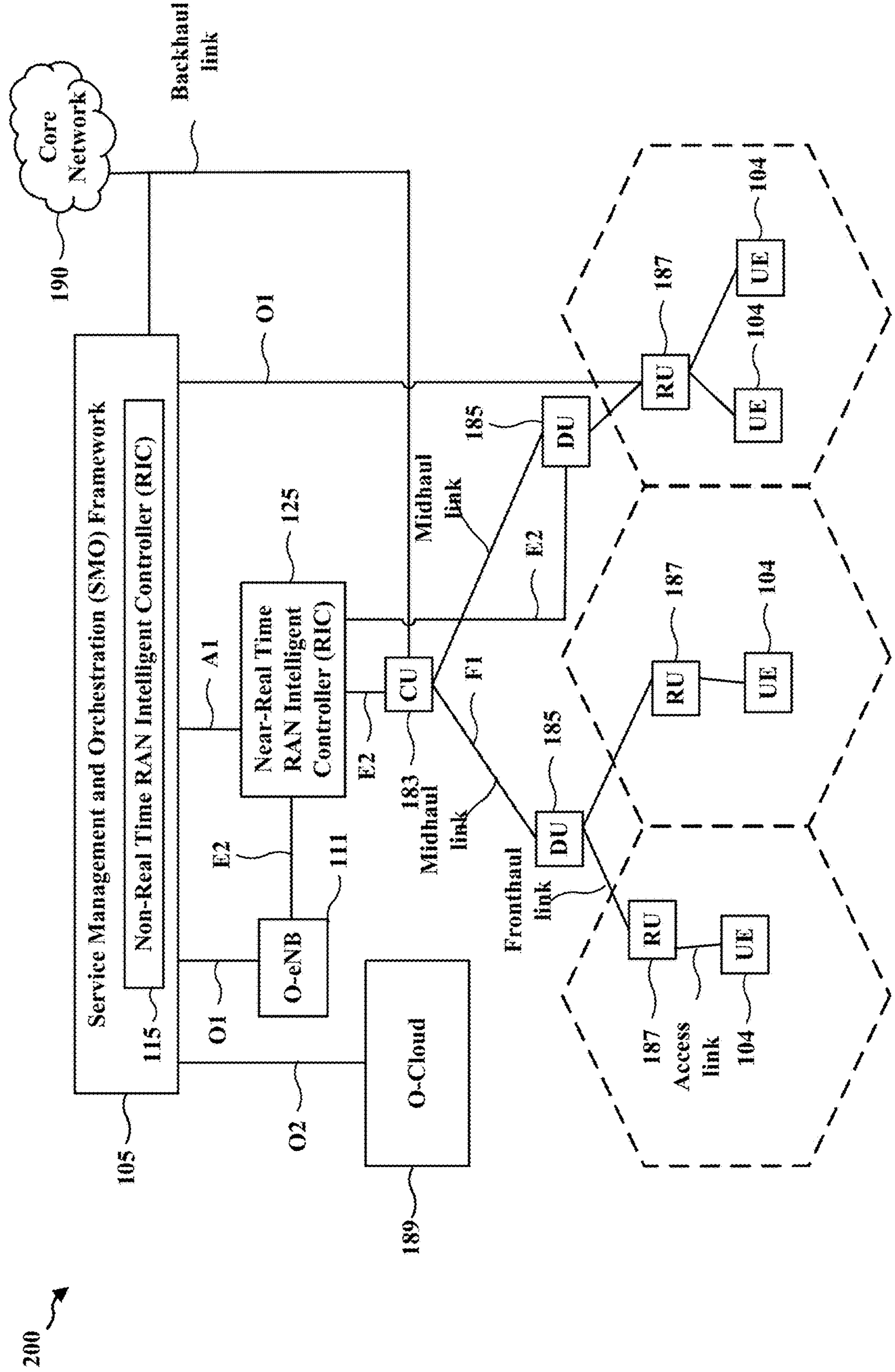
FIG. 2 is a diagram illustrating an example disaggregated base station architecture.

FIG. 2 shows a diagram illustrating an example disaggregated base station 200 architecture. The disaggregated base station 200 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

Figures 3A, 3B, 3C, 3D:
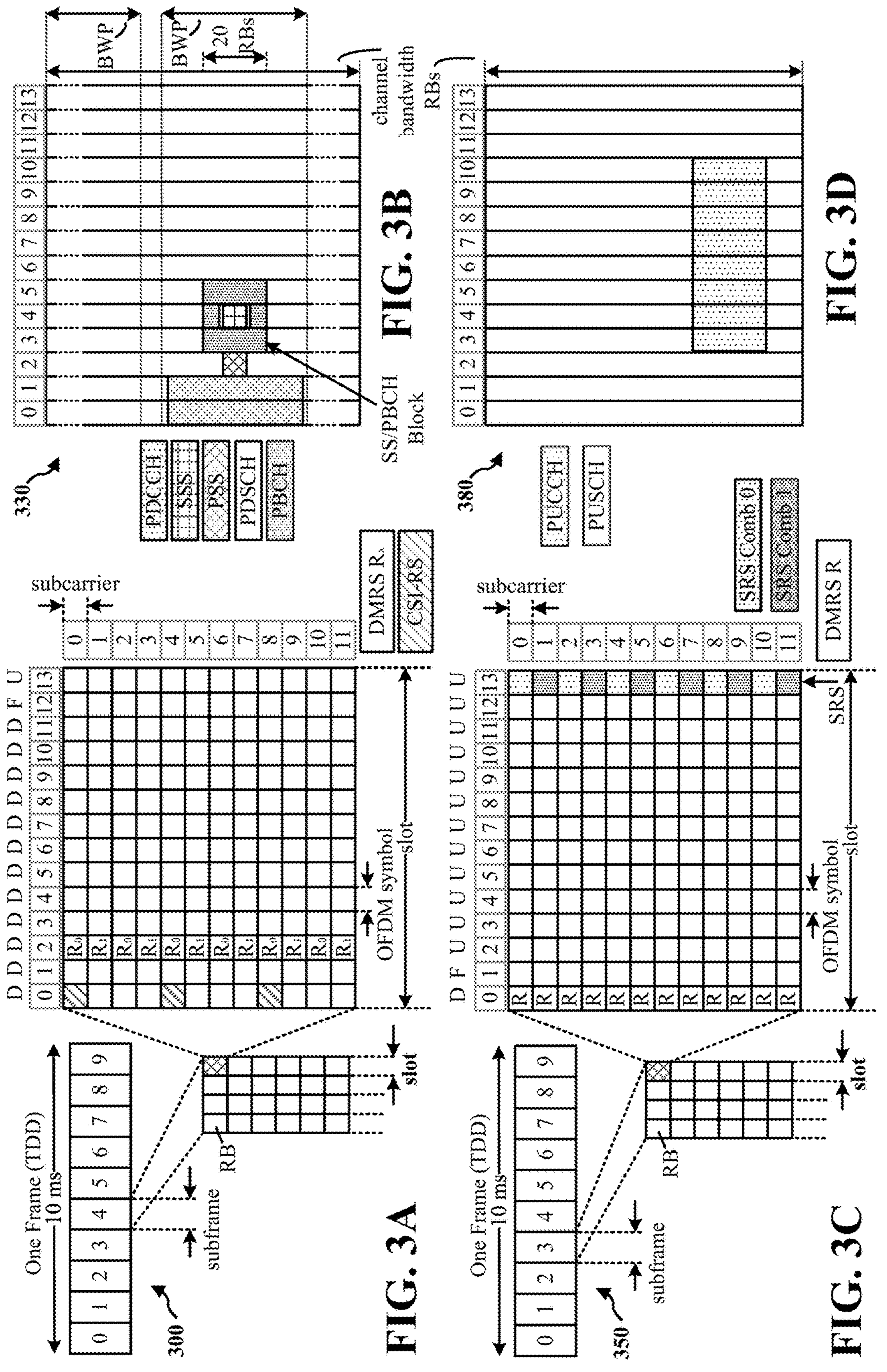
FIG. 3A is a diagram illustrating an example of a first frame, in accordance with various aspects of the present disclosure.
FIG. 3B is a diagram illustrating an example of downlink channels within a subframe, in accordance with various aspects of the present disclosure.
FIG. 3C is a diagram illustrating an example of a second frame, in accordance with various aspects of the present disclosure.
FIG. 3D is a diagram illustrating an example of uplink channels within a subframe, in accordance with various aspects of the present disclosure.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds (1.6). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RS s may be used for beam training and management, tracking and positioning, channel estimation, and/or other such purposes. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
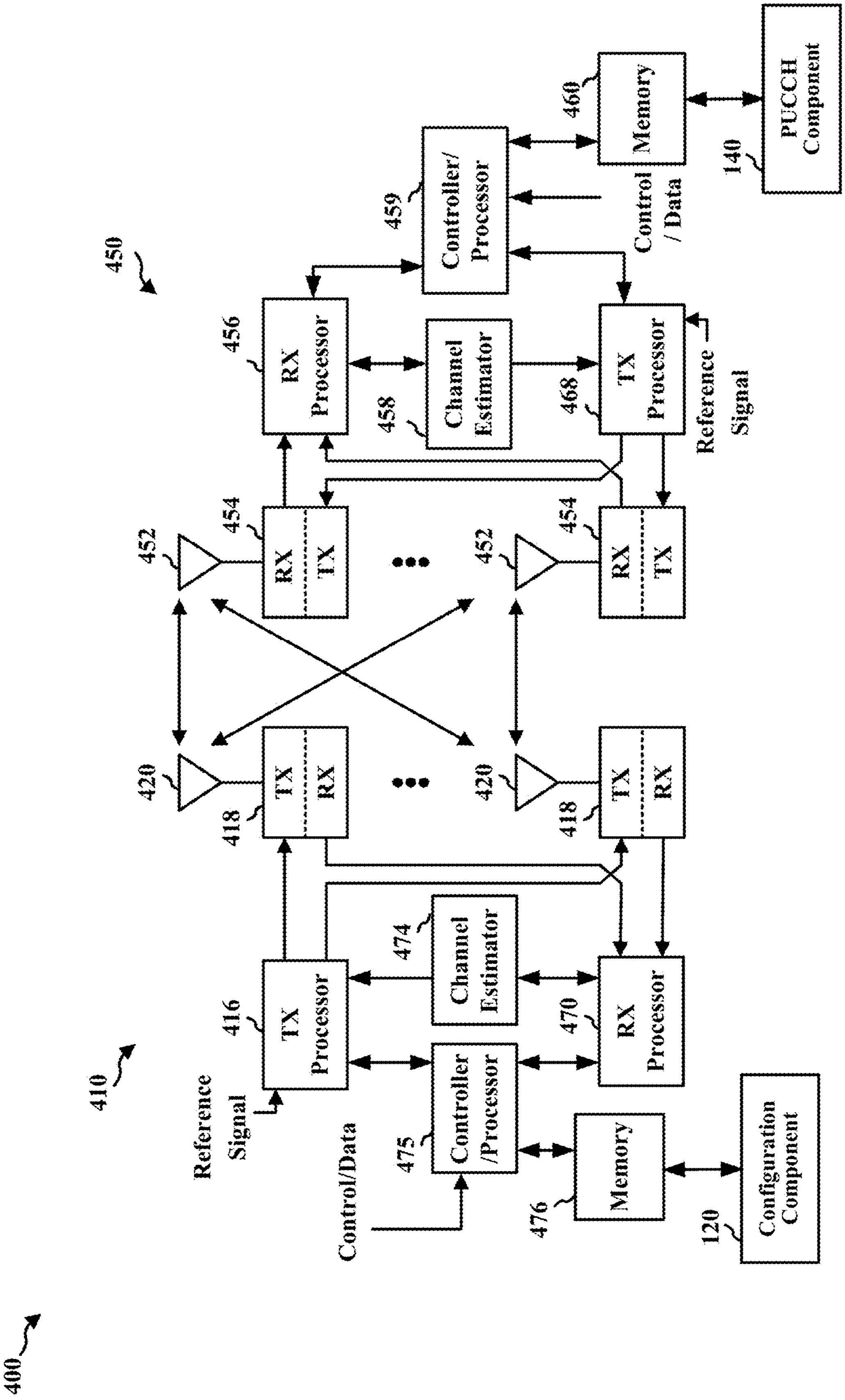
FIG. 4 is a diagram illustrating an example of a base station and user equipment (UE) in an access network.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 416 and the receive (RX) processor 470 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with the PUCCH component 140 of FIG. 1. For example, the memory 460 may include executable instructions defining the PUCCH component 140. The TX processor 468, the RX processor 456, and/or the controller/processor 459 may be configured to execute the PUCCH component 140.

At least one of the TX processor 416, the RX processor 470, and the controller/processor 475 may be configured to perform aspects in connection with the configuration component 120 of FIG. 1. For example, the memory 476 may include executable instructions defining the configuration component 120. The TX processor 416, the RX processor 470, and/or the controller/processor 475 may be configured to execute the configuration component 120.

Figure 5:
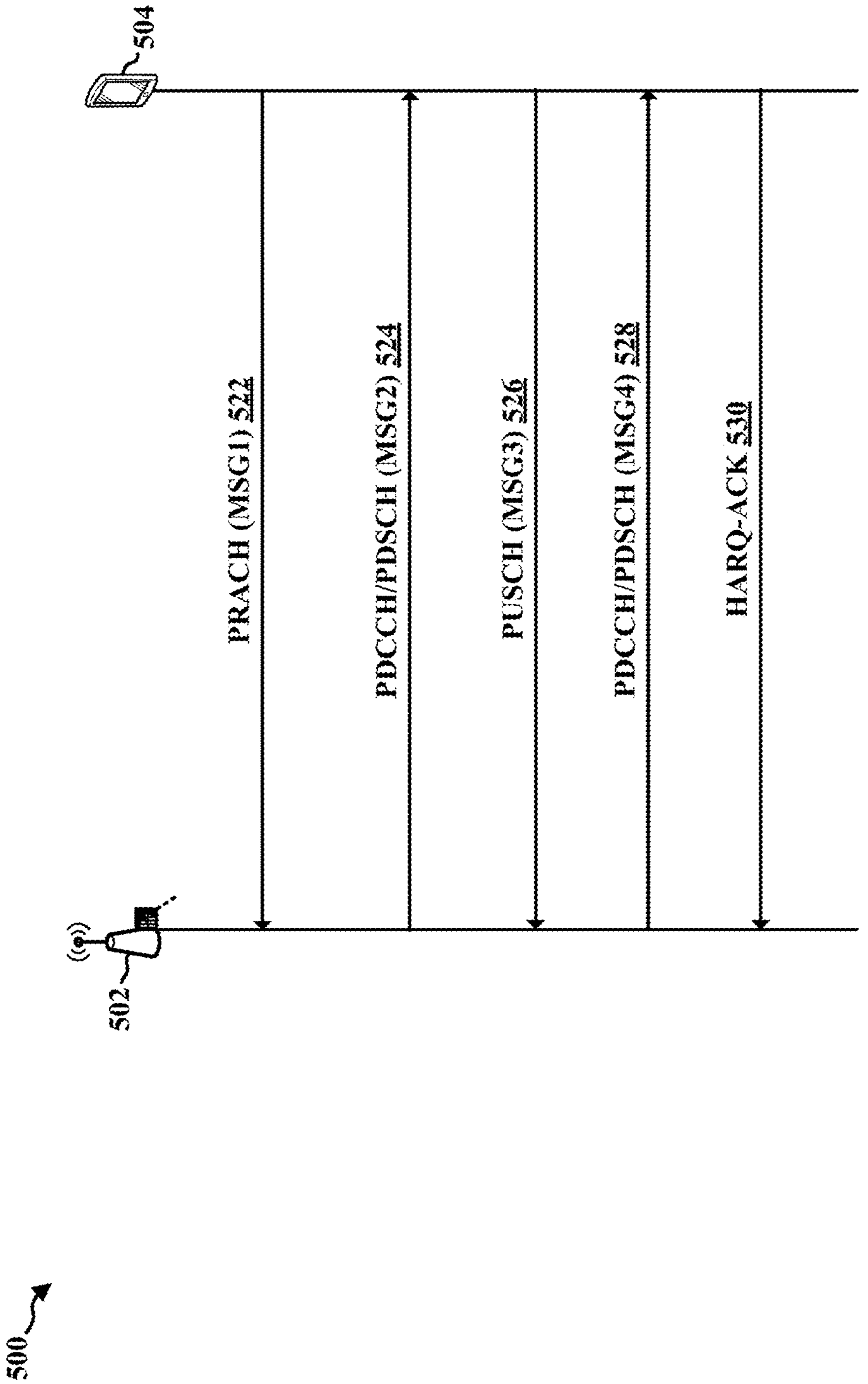
FIG. 5 is a call flow diagram illustrating an example four-step random access channel (RACH) procedure.

FIG. 5 illustrates an example of a wireless communication system 500 that supports a four-step random access channel (RACH) procedure in accordance with various aspects of the present disclosure. In some examples, wireless communication system 500 may implement aspects of access network 100. For example, wireless communication system 500 includes a UE 504 and a base station 502, which may be examples of the corresponding devices described with reference to FIG. 1. Wireless communication system 500 may support random access procedures for UEs 504 that initiate access to a base station 502.

As seen in FIG. 5, a typical RACH procedure may involve four transmissions. First, a UE 504 may transmit Message 1 (MSG1 522) on the physical random access channel (PRACH). The Message 1 transmission is a first transmission that may include a PRACH preamble, including timing information for uplink transmissions that allow the base station 502 to set timing advance parameters, for example. In response to receiving Message 1, the base station 502 may transmit a Message 2 (MSG2 524) transmission on the PDCCH or PDSCH. The Message 2 transmission may also be referred to as a random access response (RAR) message, and the contents may include timing advance parameters or information, an uplink grant for the UE's 504 Message 3 (MSG3 526) transmission on the uplink, a temporary cell radio network temporary identifier (TC-RNTI), and the like. In some instances, the TC-RNTI may be sent to the UE 504 to indicate the scrambling sequence used for Message 4 transmission.

After receiving Message 2 or the RAR, the UE 504 may then transmit Message 3 (MSG3 526) on PUSCH using resources scheduled by the uplink grant of Message 2. In some instances, the contents of Message 3 may include an RRC connection request, a scheduling request, a buffer status of the UE 504, or the like. The base station 502 may then transmit a contention resolution message referred to as Message 4 (MSG4 528) on the PDCCH or PDSCH. The UE 504 then sends a HARQ-ACK message at 530 to acknowledge that Message 4 was received at the UE 504 and the UE contention resolution identity in Message 4 matched the identity transmitted in Message 3. The UE 504 may transmit the HARQ-ACK message 530 as a PUCCH. However, because the UE has not completed the RACH procedure, the UE may not be configured with dedicated PUCCH resources. Accordingly, the UE 504 may use common PUCCH resources to transmit the HARQ-ACK message 530. The RACH procedure depicted in FIG. 5 may be performed in various use cases, including for initial access to a network or cell, when a UE 504 transitions from an RRC Idle/Inactive state to an RRC Connected state (e.g., after receiving a paging message), or when a UE 504 is changing serving base stations 502 during a handover procedure. Further, in some instances, a UE 504 may use the RACH procedure described above to send small uplink data transmissions during RRC Idle/Inactive states in order to save on the overhead costs of leaving RRC Idle/Inactive states into RRC Connected state just to transmit a relatively small amount of data.

Figure 6:
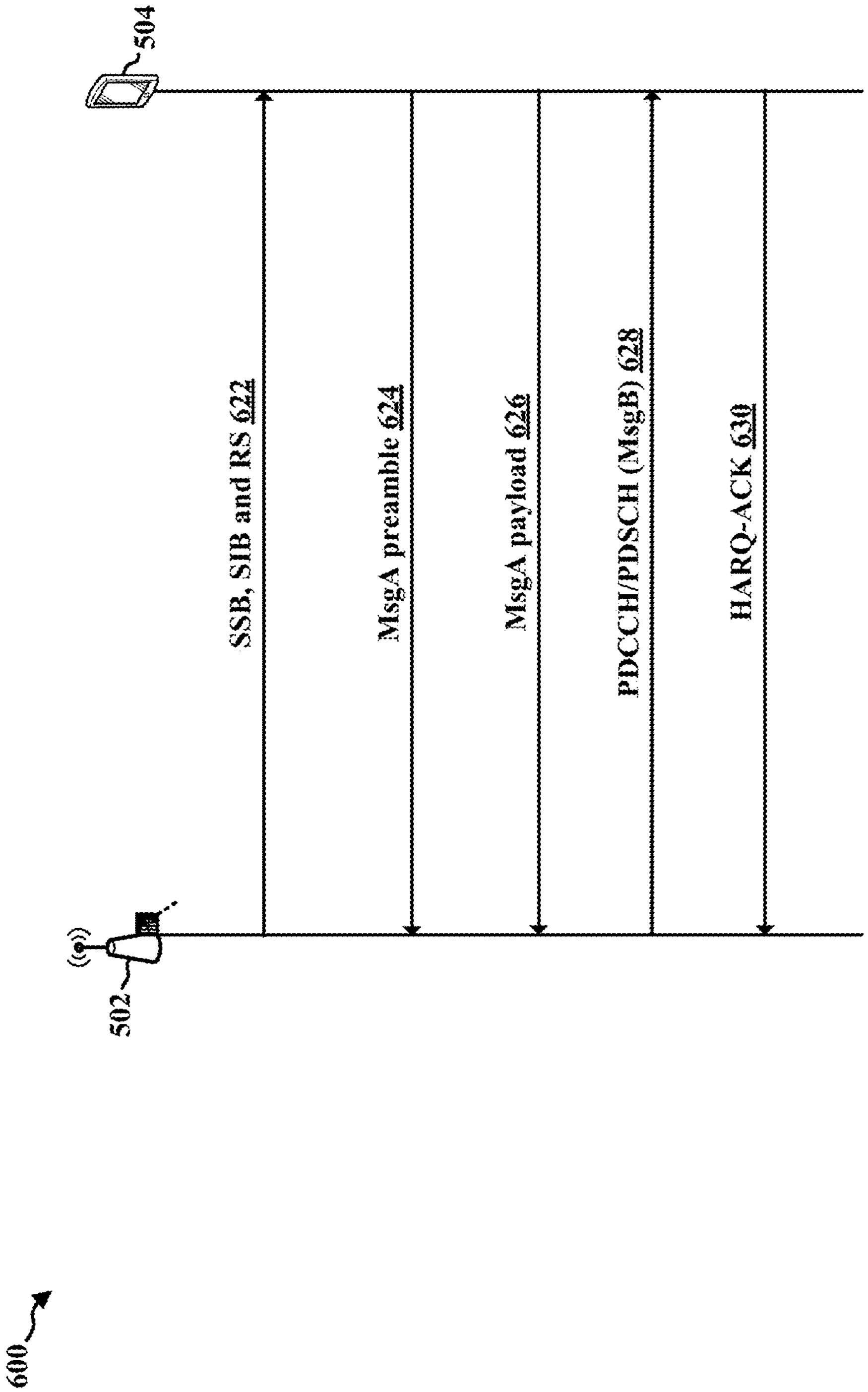
FIG. 6 is a call flow diagram illustrating an example two-step RACH procedure.

FIG. 6 illustrates an example of a two-step RACH procedure in a wireless communication system 600 in accordance with various aspects of the present disclosure. In some examples, wireless communication system 600 may implement aspects of access network 100. For example, wireless communication system 600 includes UE 504 and base station 502, which may be examples of the corresponding devices described with reference to FIG. 1. Wireless communication system 600 may support random access procedures for UEs 504 that initiate access to a base station 502.

As seen in FIG. 6, a base station 502 may transmit broadcast information to multiple UEs in a synchronization signal PBCH block (SSB 622). The UE 504 may receive and decode the SSB to obtain system information, perform synchronization procedures, and measure channel conditions based on reference signals received in the SSB. Based on the information obtained from the SSB, the UE 504 may then initiate a two-step random access procedure by transmitting a first random access message Message A (MsgA preamble 624 and MsgA payload 626) to the base station 502. The random access message Message A may be transmitted on both the PRACH and PUSCH, and may carry information similar to Message 1 and Message 3 of the four-step random access procedure described above with reference to FIG. 5. For example, Message A may include the random access preamble 624 on the PRACH as well as a random access payload 626 that includes an RRC connection request, a scheduling request, buffer status, and the like, on the PUSCH. In response, the base station 502 may transmit a random access response in Message B (MsgB 628). Message B may include timing advance information as well as a contention resolution message. In response to Message B, the contention resolution message, the UE 504 may send a HARQ-ACK message (e.g., HARQ-ACK 630) to acknowledge whether Message B was successfully received.

For both the four-step RACH procedure described above with respect to FIG. 5 and the two-step RACH procedure described above with respect to FIG. 6, the HARQ-ACK message acknowledging the contention resolution message (Message 4 or Message B) may be transmitted on the PUCCH prior to the UE 504 receiving a dedicated PUCCH resource configuration. In particular, the UE 504 may transmit the HARQ-ACK message on PUCCH resources that are assigned via indication in system information (e.g., SIB1). For example, the base station 502 may transmit an index in SIB1 (e.g., remaining minimum system information (RMSI)) that specifies which resources to use for the PUCCH transmission that includes the HARQ-ACK message based on a table known to the UE 504 and the base station 502. The index provided by the base station 502 may correspond to a particular row in a table, where the UE 504 can obtain the information for identifying a set of PUCCH resources that could be used for transmitting the HARQ-ACK message. As shown in Table 1, for example, if the base station 502 indicates to the UE 504 an index of 6 to use for PUCCH resource assignment, the UE 504 determines that a PUCCH transmission will follow PUCCH format 1, will be transmitted on symbol 10 of the uplink slot, will be four symbols in length, and will have a PRB offset starting at four. As also determined from Table 1, the PUCCH transmission may have a cyclic shift based on a set of potential set of cyclic shift indexes comprising {0, 3, 6, 9}.

TABLE 1

| PUCCH resource sets before dedicated PUCCH resource configuration | | | | | |
|---|---|---|---|---|---|
| Index | PUCCH format | First symbol | Number of symbols | PRB offset | Set of Initial CS indexes |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N^{SIZE}_{BWP}/4]$ | {0, 3, 6, 9} |

In reference to Table 1 above, a cell-specific PDCCH parameter provided in SIB (e.g., PUCCH-ConfigCommon IE) may indicate a resource set identified by a row in a table (see above Table 1 PUCCH resource set before a dedicated PUCCH resource configuration). However, there is no repetition associated with the resource set. In an aspect, the UE 504 may use the properties associated with the resource set (e.g., PRB offset, set of initial CS indexes) to compute an index $r_{PUCCH}$ based on a combination of the PUCCH Resource Indicator (PRI) signaled in the DCI scheduling a PDSCH (that carries, e.g., Message 4) and the index of an allocated Control Channel Element (CCE) of the CORESET of the PDCCH (that carries the DCI). This allows the index $r_{PUCCH}$ to determine a PUCCH resource for transmitting the HARQ ACK bit.

When frequency hopping is used, the index $r_{PUCCH}$ may be used to determine the PUCCH resource for each hop. For example, if $r_{PUCCH}/8=0$, prior to dedicated PUCCH resource configuration, the UE may determine the lowest PRB index of the PUCCH transmission in the first hop as $$RB_{BWP}^{offset} \cdot N_{RB} + \lfloor r_{PUCCH} / N_{CS} \rfloor \cdot N_{RB}$$

and the lowest PRB index of the PUCCH transmission in the second hop as $$N_{BWP}^{size} - RB_{BWP}^{offset} \cdot N_{RB} - (1 + \lfloor r_{PUCCH} / N_{CS} \rfloor) \cdot$$

$N_{RB}$, where $N_{CS}$ is the total number of initial cyclic shift indexes in the set of initial cyclic shift indexes. The UE determines the initial cyclic shift index in the set of initial cyclic shift indexes as $r_{PUCCH} \bmod N_{CS}$. If $\lfloor r_{PUCCH}/8 \rfloor=1$ prior to dedicated PUCCH resource configuration, the UE may determine the lowest PRB index of the PUCCH transmission in the first hop as $$N_{BWP}^{size} - RB_{BWP}^{offset} \cdot N_{RB} - (1 + \lfloor (r_{PUCCH} - 8) / N_{CS} \rfloor) \cdot N_{RB}$$

and the lowest PRB index of the PUCCH transmission in the second hop as $$RB_{BWP}^{offset} \cdot N_{RB} + \lfloor (r_{PUCCH} - 8 / N_{CS} \rfloor \cdot N_{RB}.$$

The UE determines the initial cyclic shift index in the set of initial cyclic shift indexes as $(r_{PUCCH}-8) \bmod N_{CS}$.

As described above, conventionally, repetition may not be supported for PUCCH transmissions scheduled prior to configuration of dedicated PUCCH resources. Examples of PUCCH transmissions that may occur without or prior to configuration of dedicated PUCCH resources may include HARQ-ACK messages in response to Message 4 or Message B reception during random access procedures. Certain wireless communication deployments, however, may require further coverage enhancements. For example, in NTNs, where uplink coverage may suffer from long distances, coverage enhancement for HARQ-ACK messages related to the random access procedure may improve the ability of the UE to establish a connection. Accordingly, configuring PUCCH repetitions and frequency hopping for HARQ-ACK messages prior to configuration of dedicated PUCCH resources may provide coverage enhancement benefits to a variety of applications. Specifically, PUCCH performance for carrying the HARQ ACK bit for the RRC configuration may be enhanced for both a normal contention scenario and an early contention scenario.

Figure 7:
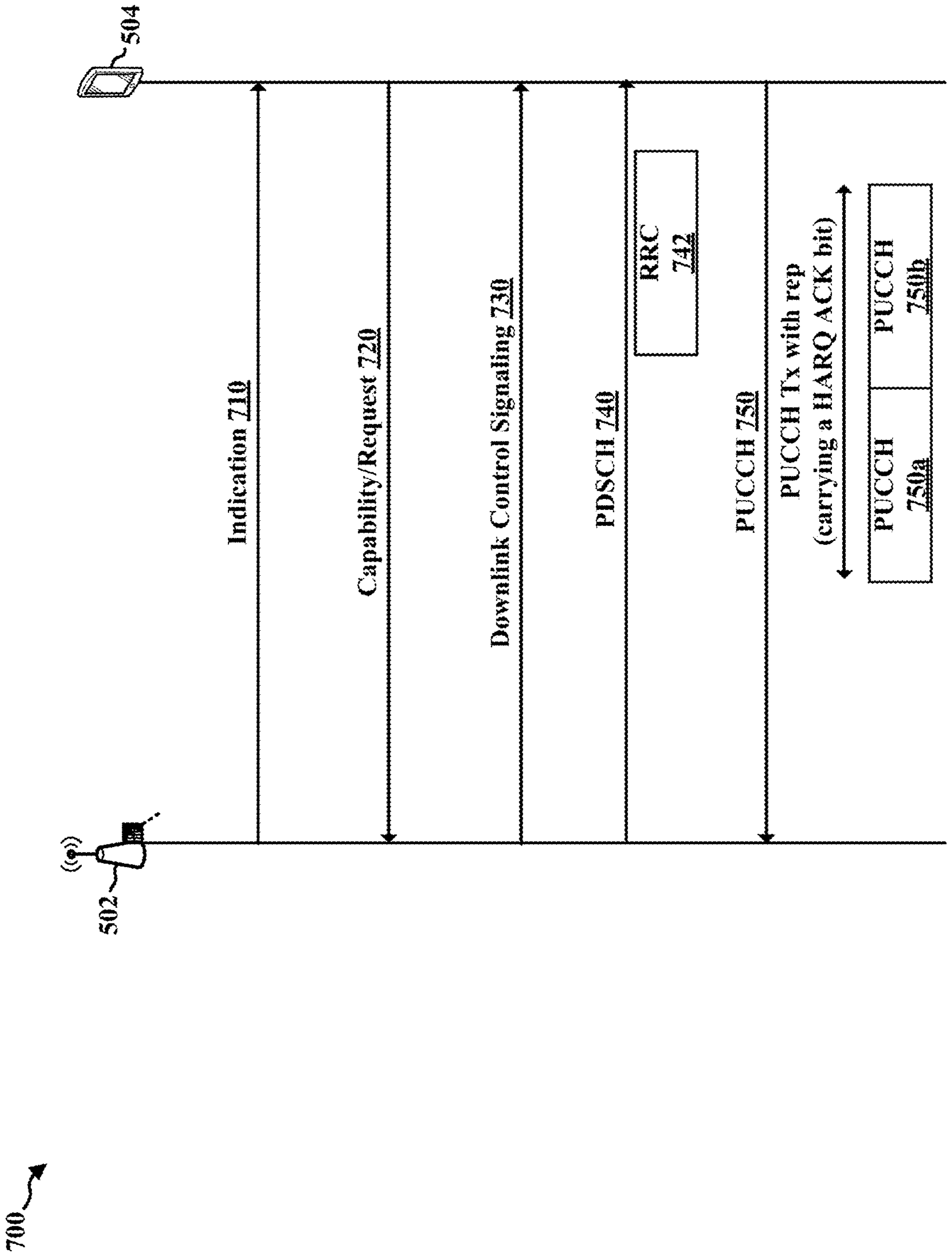
FIG. 7 is a call flow diagram illustrating an example procedure for establishing an enhanced physical uplink control channel (PUCCH) frequency hopping pattern prior to dedicated PUCCH resource configuration.

FIG. 7 is a diagram of a call flow 700 between a base station 502 and a UE 504. The call flow 700 illustrates an exemplary sequence of operations performed between the base station 502 and UE 504 to enhance HARQ ACK for Message 4 or Message B by establishing an enhanced frequency hopping pattern prior to dedicated PUCCH resource configuration. For example, the call flow 700 depicts operations for applying PUCCH repetition for HARQ-ACK messages prior to configuration of dedicated PUCCH resources. It is understood that one or more of the operations described in the call flow 700 may be performed earlier or later in the process, omitted, replaced, supplemented, or combined with another operation. Also, additional operations described herein that are not included in call flow 700 may be included in call flow 700.

The UE 504 may correspond to UE 104, 450, and apparatus 1402. The base station 502 may correspond to base station 102/180, 410, and apparatus 1502.

Initially, the UE 504 may determine whether the base station 502 supports an enhanced PUCCH frequency hopping pattern for PUCCH with repetition prior to dedicated PUCCH resource configuration. The base station 502 may transmit an indication 710 that indicates whether a cell supports an enhanced PUCCH frequency hopping pattern. For example, the indication 710 may be indicated by a SSB for the cell. As another example, the indication 710 may be indicated by a SIB message. In some implementations, the indication 710 may indicate support for enhanced PUCCH frequency hopping pattern. The enhanced PUCCH frequency hopping pattern may be defined in a standards document or regulation. In some implementations, the indication 710 may indicate a supported enhanced PUCCH frequency hopping pattern, for example, as an index of a defined pattern or one or more parameters of the pattern. The UE 504 may receive the indication 710 and determine support for an enhanced PUCCH frequency hopping pattern for PUCCH with repetition prior to dedicated PUCCH resource configuration.

The UE 504 may transmit a capability or request 720 of the UE for the enhanced PUCCH frequency hopping pattern (for PUCCH with repetition before dedicated PUCCH resource configuration). In some implementations, the capability or request 720 may indicate a capability of the UE to transmit PUCCH with an enhanced frequency hopping pattern prior to dedicated PUCCH resource configuration. In some implementations, the capability or request 720 may indicate a request of the UE 504 transmit PUCCH with an enhanced frequency hopping pattern prior to dedicated PUCCH resource configuration. In some implementations, the capability/request 720 may be combined with a capability/request for PUCCH repetition prior to dedicated PUCCH resource configuration. That is, the capability/request 720 may indicate a capability/request for both PUCCH repetition prior to dedicated PUCCH resource configuration and a capability/request for an enhanced frequency hopping pattern prior to dedicated PUCCH resource configuration. In some implementations, the capability/request 720 may be referred to as a capability/request for PUCCH repetition and may also indicate a capability/request for PUCCH repetition prior to dedicated PUCCH resource configuration. In some implementations, the capability/request 720 may indicate both a capability and a request (e.g., using two bits). For example, the capability/request 720 may include a first bit indicating that the UE is capable of enhanced PUCCH frequency hopping pattern, but a second bit may indicate that enhanced PUCCH frequency hopping and/or PUCCH repetition prior to dedicated PUCCH resource configuration is not requested (e.g., because channel conditions are good).

In an aspect, the capability/request 720 may be transmitted prior to the random access Message 4 or Message B. In some implementations, the capability/request 720 may be indicated by a field in Message 3. For example, the UE 504 may transmit a MSG3 526 with a field set to indicate the capability or request of the UE for the enhanced PUCCH frequency hopping pattern. In some implementations, the field is a logical channel identifier (LCID) code point for an uplink common control channel (UL CCCH). For instance, the LCID may be reserved to indicate a capability or request for the enhanced PUCCH frequency hopping pattern. In some implementations, the field is a value in a UL-CCCH1-MessageType within a UL-CCH1-Message class. In some implementations, the field is a reserved bit in a MAC subheader for UL CCCH data. For instance, the MAC subheader may include two reserved bits, and one of the bits may be reserved for indicating the capability or request. In some implementations, the field is a spare bit in a radio resource control (RRC) connection request message or an RRC connection resume request. In some implementations, the field is an identifier of the user equipment such as a temporary mobile subscriber identifier (TMSI). In some implementations, the field is a value of a RRC information element such as an EstablishmentCause.

In another aspect, indicating at least one of the capability or the request of the UE for the enhanced PUCCH frequency hopping includes transmitting a random access message 3 (e.g., MSG 3 536) with a parameter that indicates the capability or the request of the UE for the enhanced PUCCH frequency hopping pattern. In some implementations, the parameter is a DMRS port (e.g., a DMRS port other than port 0). In some implementations, the parameter is a DMRS sequence. For example, the DMRS sequence may use a random seed formula ($c_{init}$) that is different than for UEs that do not support enhanced PUCCH frequency hopping patterns. In some implementations, the DMRS may be generated with a cyclic shift that is different from the one (for UEs not able to support Msg4 PUCCH repetition) when transform precoding is applied to the corresponding PUSCH. In some implementations, the parameter is a PUSCH scrambling ID. For example, the PUSCH scrambling ID may be incremented by 1 to indicate a capability for enhanced PUCCH frequency hopping patterns.

In another aspect, the capability/request 720 may be indicated by a random access message 1 with a parameter that indicates the capability or the request of the UE 504 for the enhanced PUCCH frequency hopping pattern. For example, the UE 504 may transmit the MSG1 522, where the parameter is one of: a PRACH format, a subset of PRACH sequences, or a subset of RACH occasions.

The base station 502 may transmit downlink control signaling 730 that indicates whether the enhanced PUCCH frequency hopping pattern (for PUCCH with repetition before dedicated PUCCH resource configuration) is configured for the UE 504. For example, the downlink control signaling 730 may include one or more bits indicating whether the enhanced PUCCH frequency hopping pattern is configured for the UE 504. In some implementations, the downlink control signaling 730 may indicate the configured enhanced PUCCH frequency hopping pattern. For example, in some implementations, the downlink control signaling 730 may be a downlink control information (DCI) that schedules a random access message 4 (e.g., MSG4 528) and includes at least one bit that indicates configuration of the enhanced PUCCH frequency hopping. The DCI may be a DCI format 1_0 and be scrambled with a TC-RNTI. In some implementations, the downlink control signaling 730 may be a DCI that schedules a random access message 2 (e.g., MSG2 524) and includes at least one bit that indicates configuration of the enhanced PUCCH frequency hopping. The DCI may be a DCI format 1_0 with CRC scrambling by RA-RNTI. As another example, the downlink control signaling 730 may be a random access message 2 (e.g., MSG2 524) that includes a random access response uplink grant with at least one bit that indicates configuration of the enhanced PUCCH frequency hopping.

The UE 504 may be configured to receive a PDSCH 740 carrying an RRC message 742 (e.g., Message 4 (e.g., MSG4 528) or Message B (e.g., MsgB 628)). In an aspect, the RRC message 742 may provide contention resolution for the random access procedure.

In response to receiving the PDSCH 740, the UE 504 may be configured to transmit a PUCCH transmission 750 with repetitions (carrying a HARQ ACK bit) according to a number of repetitions (e.g., repetitions 750*a* and 750*b*). Further the PUCCH transmission 750 and the repetitions 750*a*, 750*b* may follow the enhanced PUCCH frequency hopping pattern. The PUCCH transmission 750 may be prior to dedicated PUCCH resource configuration for the UE 504. It should be understood that the specific RRC messages and the number of repetitions used in call flow 700 diagram is non-limiting should be illustrative only.

Figure 8:
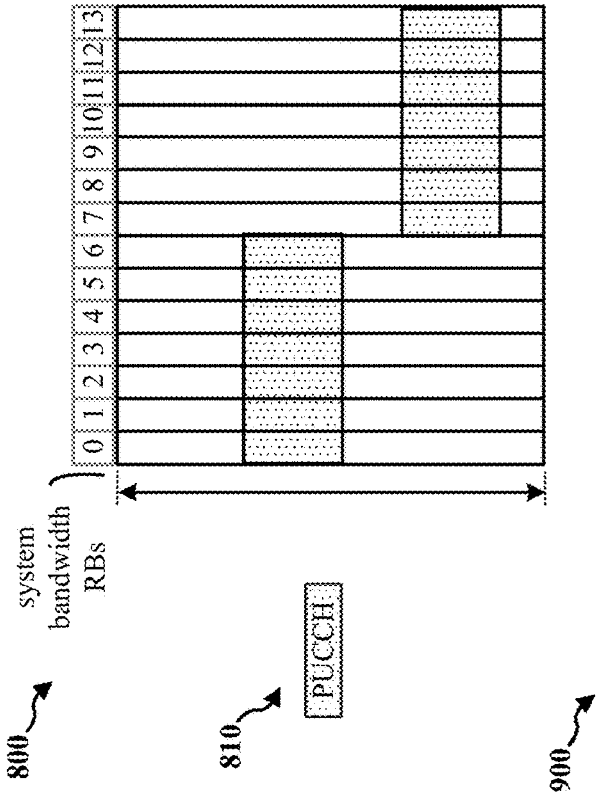
FIG. 8 illustrates an example of intra-slot frequency hopping for a PUCCH transmission.

FIG. 8 illustrates an example 800 of intra-slot frequency hopping for a PUCCH transmission 810. Conventionally, intra-slot frequency hopping may be configured unless interlaced transmission is configured. For instance, interlaced transmission may be indicated by the presence of an useInterlacePUCCH-PUSCH information element and be used for meeting power spectral density limitations in NR-U. Interlaced transmission may not be applicable to cases where PUCCH coverage enhancement is desired.

In conventional intra-slot frequency hopping, the frequency gap between hops is determined by an index $r_{PUCCH}$ computed from the PUCCH Resource Indicator (PRI) signaled in the DCI scheduling a PDSCH (that carries, e.g., Msg4) and the index of a first CCE for the CORESET of the PDCCH (that carries the DCI). Each hop stays for half of the configured symbols. For example, as listed in Table 1 above, PUCCH resource sets before dedicated PUCCH resource configuration may include 2, 4, 10, or 14 symbols. In FIG. 8, the PUCCH transmission 810 may be transmitted on a PUCCH resource configured with 14 symbols starting at symbol 0. The frequency changes from a first hop to a second hop between symbols 6 and 7.

Frequency hopping may increase frequency diversity, which may improve reception, for example, in scenarios where different sub-channels experience different conditions. Frequency hopping, however, may interrupt phase continuity. DMRS bundling may be used to transmit DMRS across multiple symbols. With intra-slot frequency hopping, the interrupted phase continuity may prevent DMRS bundling.

Figure 9:
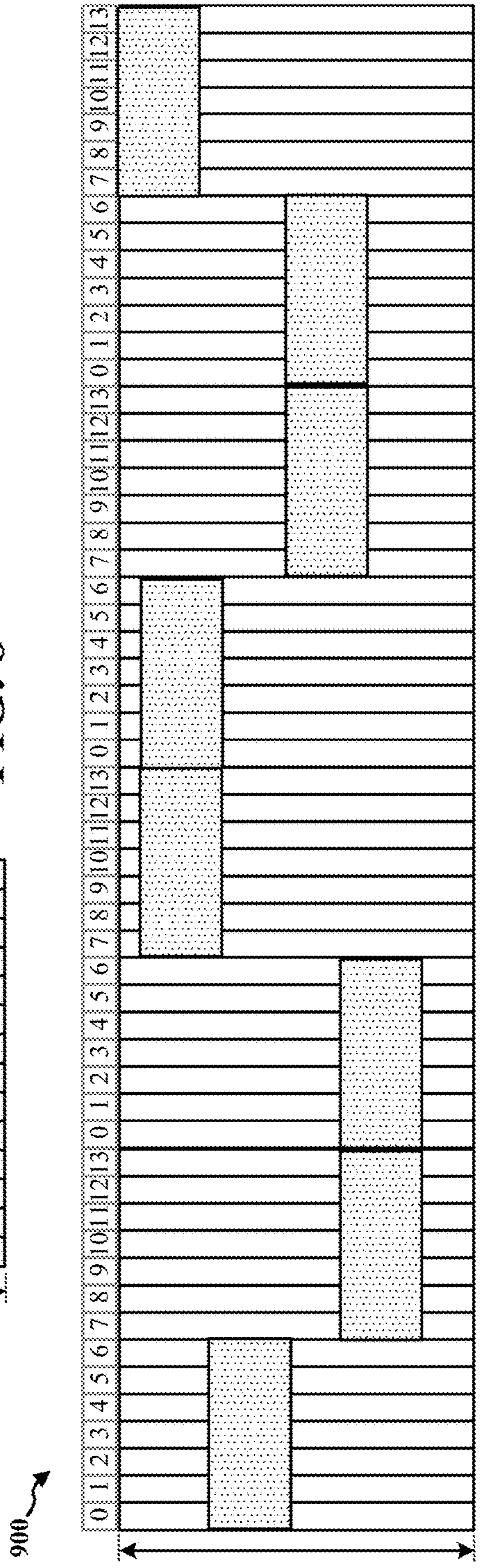
FIG. 9 illustrates a first enhanced PUCCH frequency hopping pattern for PUCCH with repetition prior to dedicated PUCCH resource configuration.

FIG. 9 illustrates a first enhanced PUCCH frequency hopping pattern 900 for PUCCH with repetition prior to dedicated PUCCH resource configuration. The first enhanced PUCCH frequency hopping pattern 900 may include intra-slot frequency hopping in every slot of the PUCCH with repetition. For example, a PUCCH may be transmitted on a PUCCH resource configured with 14 symbols starting at symbol 0 and be repeated 4 times. The intra-slot frequency hopping may include a change of frequency after half of the symbols in each slot.

Figure 10:
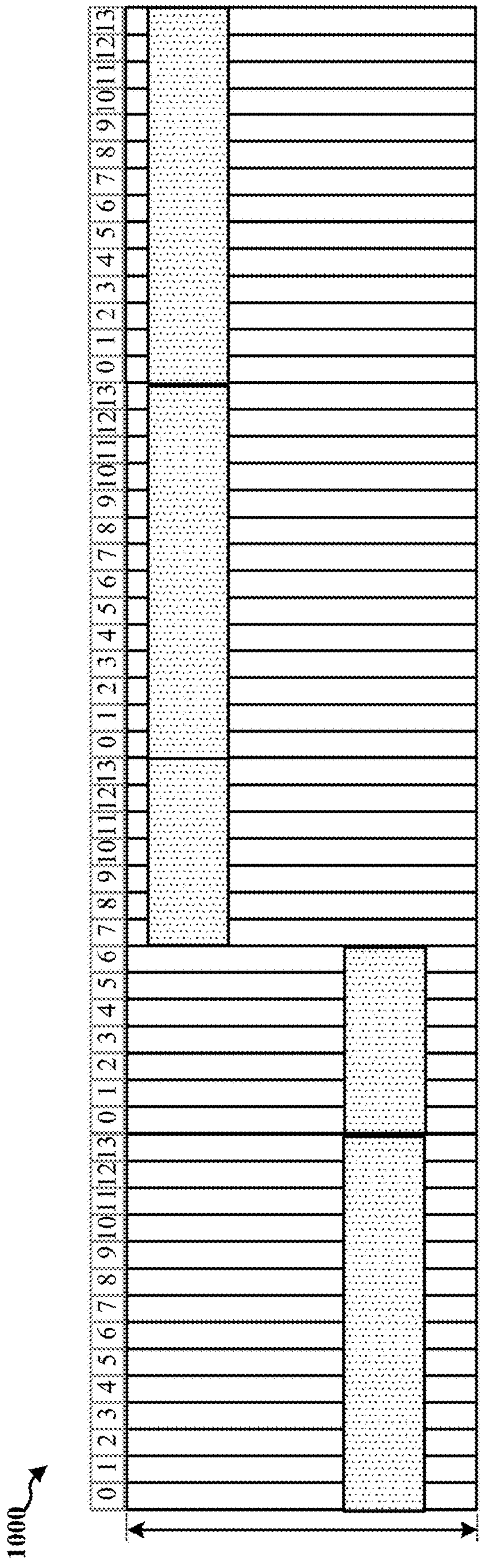
FIG. 10 illustrates a second enhanced PUCCH frequency hopping pattern for PUCCH with repetition prior to dedicated PUCCH resource configuration.

FIG. 10 illustrates a second enhanced PUCCH frequency hopping pattern 1000 for PUCCH with repetition prior to dedicated PUCCH resource configuration. The second enhanced PUCCH frequency hopping pattern 1000 may include intra-slot frequency hopping in one slot of the PUCCH with repetition. In an aspect, the intra-slot frequency hopping occurs within a slot that is near the middle of the PUCCH. The number of repetitions of the PUCCH, however, may be even (e.g., 4), so the change of frequency may not occur in the middle of the PUCCH. That is, there may be an uneven number of symbols in the first hop and the second hop. In some implementations, the second enhanced PUCCH frequency hopping pattern 1000 may support DMRS bundling.

Figure 11:
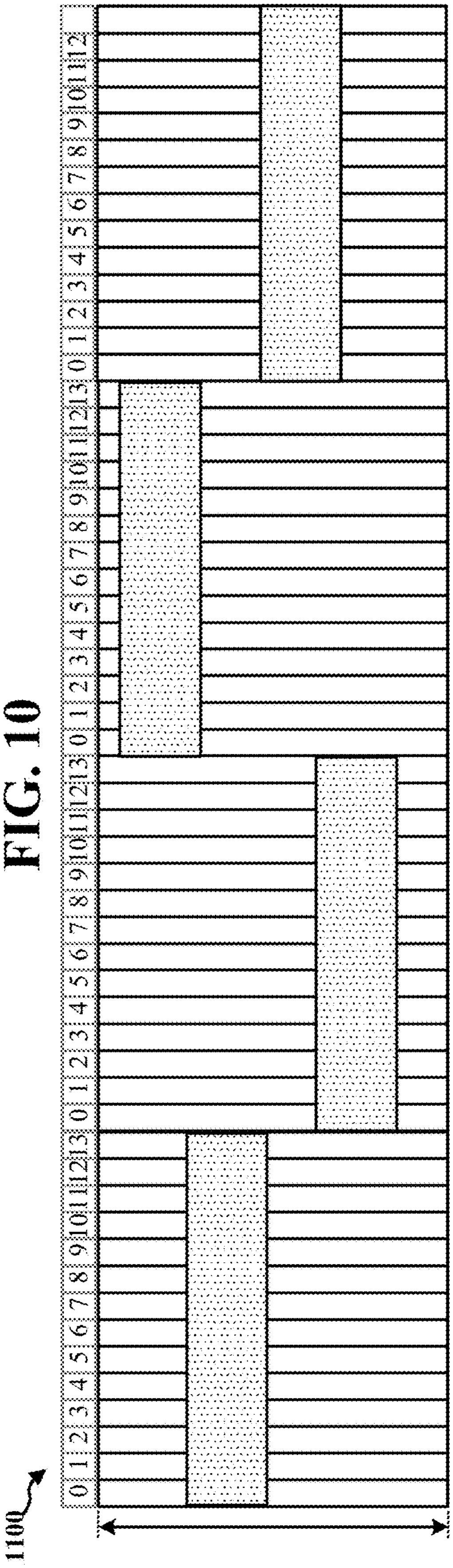
FIG. 11 illustrates a third enhanced PUCCH frequency hopping pattern for PUCCH with repetition prior to dedicated PUCCH resource configuration.

FIG. 11 illustrates a third enhanced PUCCH frequency hopping pattern 1100 for PUCCH with repetition prior to dedicated PUCCH resource configuration. The third enhanced PUCCH frequency hopping pattern 1100 may include inter-slot frequency hopping between slots or time domain windows of the PUCCH with repetition. Conventionally, inter-slot frequency hopping is not supported for PUCCH prior to dedicated PUCCH resource configuration because the PUCCH resources do not span a slot boundary. However, with repetition, the PUCCH may span multiple symbols. The inter-slot boundaries may equally divide the PUCCH into frequency hops of equal length. In some implementations, the third enhanced PUCCH frequency hopping pattern 1100 may support DMRS bundling. For example, a time domain window for DMRS bundling may be used to define the inter-slot frequency hops such that the DMRS within a frequency hop is bundled.

Figure 12:
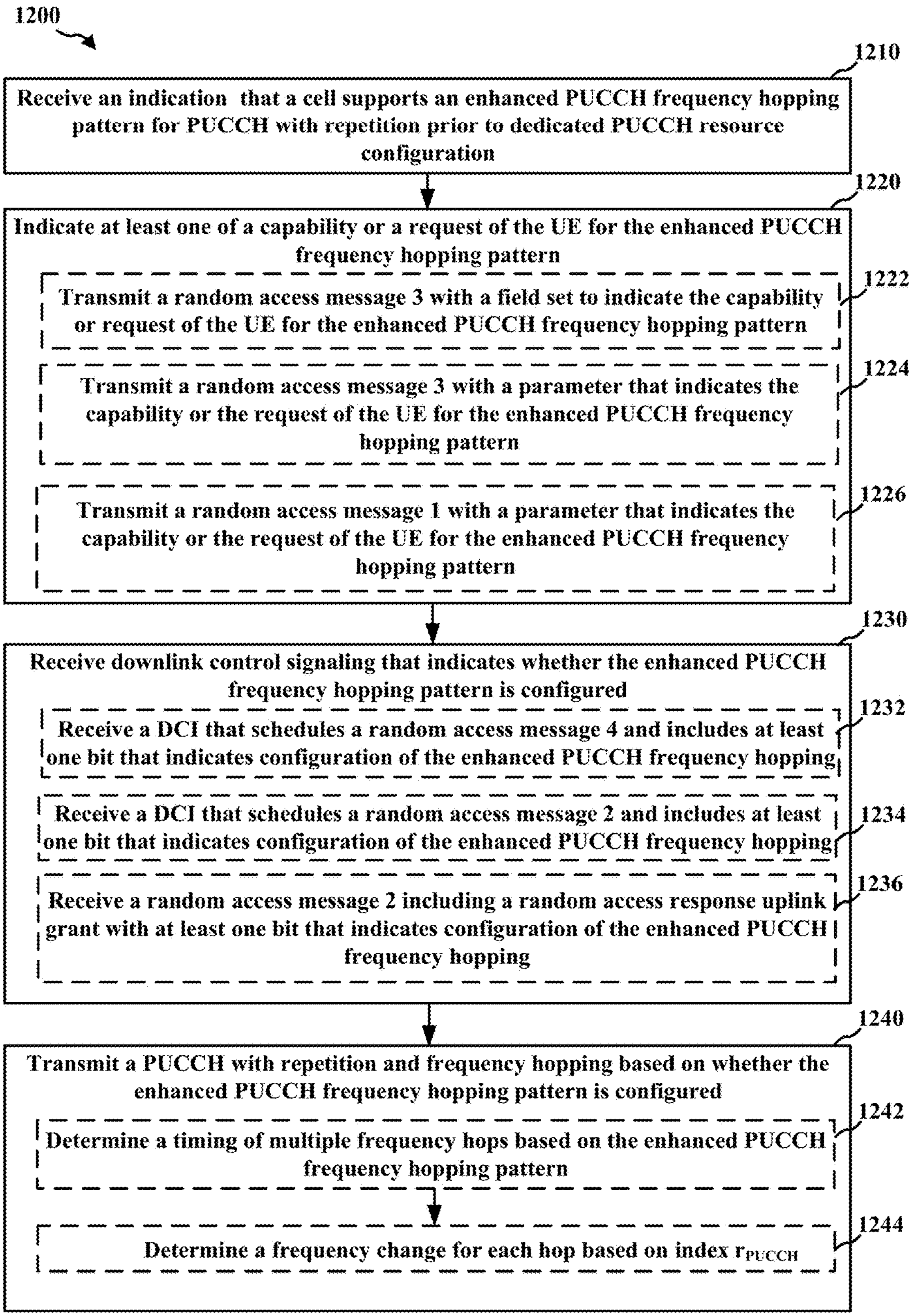
FIG. 12 is a flowchart of an example method 1200 for a UE 104 to transmit PUCCH with repetition and frequency hopping prior to dedicated PUCCH resource configuration.

FIG. 12 is a flowchart of an example method 1200 for a UE 104 to transmit PUCCH with repetition and frequency hopping prior to dedicated PUCCH resource configuration. The method 1200 may be performed by a UE 104 (such as the UE 104, which may include the memory 460 and which may be the entire UE 104 or a component of the UE 104 such as the PUCCH component 140, TX processor 468, the RX processor 456, or the controller/processor 459). The method 1200 may be performed by the PUCCH component 140 in communication with the configuration component 120 of the base station 102. Optional blocks are shown with dashed lines.

At block 1210, the method 1200 includes receiving an indication that a cell supports an enhanced PUCCH frequency hopping pattern for PUCCH with repetition prior to dedicated PUCCH resource configuration. In some implementations, for example, the UE 104, the RX processor 456 or the controller/processor 459 may execute the PUCCH component 140 or the support component 142 to receive the indication 710 that a cell supports an enhanced PUCCH frequency hopping pattern for PUCCH with repetition prior to dedicated PUCCH resource configuration. In some implementations, the support component 142 may determine that the cell supports an enhanced PUCCH frequency hopping pattern for PUCCH with repetition prior to dedicated PUCCH resource configuration based on the indication 710. In some implementations, the support component 142 may determine a supported enhanced PUCCH frequency hopping pattern based on the indication. Accordingly, the UE 104, the RX processor 456, or the controller/processor 459 executing the PUCCH component 140 or the support component 142 may provide means for receiving an indication that a cell supports an enhanced PUCCH frequency hopping pattern for PUCCH with repetition prior to dedicated PUCCH resource configuration.

At block 1220, the method 1200 includes indicating at least one of a capability or a request of the UE for the enhanced PUCCH frequency hopping pattern. In some implementations, for example, the UE 104, the TX processor 468, or the controller/processor 459 may execute the PUCCH component 140 or the indication component 144 to indicate at least one of a capability or a request 720 of the UE for the enhanced PUCCH frequency hopping pattern.

In some implementations, at sub-block 1222, the block 1220 may optionally include transmitting a random access message 3 with a field set to indicate the capability or request of the UE for the enhanced PUCCH frequency hopping pattern. For example, the field may be one of: a LCID code point for an UL CCCH; a value in a UL-CCH1-MessageType within a UL-CCH1Message class; a reserved bit in a MAC subheader for UL CCCH data; a spare bit in a RRC connection request message or an RRC connection resume request; an identifier of the user equipment; or a value of a RRC information element.

In some implementations, at sub-block 1224, the block 1220 may optionally include transmitting a random access message 3 with a parameter that indicates the capability or the request of the UE for the enhanced PUCCH frequency hopping pattern. For example, the parameter may be one or more of: a DMRS port, a DMRS sequence, or a PUSCH scrambling ID.

In some implementations, at sub-block 1226, the block 1220 may optionally include transmitting a random access message 1 with a parameter that indicates the capability or the request of the UE for the enhanced PUCCH frequency hopping pattern. For example, the parameter may be one of: a PRACH format, a subset of PRACH sequences, or a subset of RACH occasions.

In view of the foregoing, the UE 104, the TX processor 468, or the controller/processor 459 executing the PUCCH component 140 or the indication component 144 may provide means for indicating at least one of a capability or a request of the UE for the enhanced PUCCH frequency hopping pattern.

At block 1230, the method 1200 includes receiving downlink control signaling that indicates whether the enhanced PUCCH frequency hopping pattern is configured. In some implementations, for example, the UE 104, the RX processor 456 or the controller/processor 459 may execute the PUCCH component 140 or the frequency hopping component 146 to receive downlink control signaling 730 that indicates whether the enhanced PUCCH frequency hopping pattern is configured. In some implementations, at sub-block 1232, the block 1230 may optionally include receiving a DCI that schedules a random access message 4 and includes at least one bit that indicates configuration of the enhanced PUCCH frequency hopping. In some implementations, at sub-block 1234, the block 1230 may optionally include receiving a DCI that schedules a random access message 2 and includes at least one bit that indicates configuration of the enhanced PUCCH frequency hopping. In some implementations, at sub-block 1236, the block 1230 may optionally include receiving a random access message 2 including a random access response uplink grant with at least one bit that indicates configuration of the enhanced PUCCH frequency hopping. Accordingly, the UE 104, the RX processor 456, or the controller/processor 459 executing the PUCCH component 140 or the support component 142 may provide means for receiving downlink control signaling that indicates whether the enhanced PUCCH frequency hopping pattern is configured.

At block 1240, the method 1200 includes transmitting a PUCCH with repetition and frequency hopping based on whether the enhanced PUCCH frequency hopping pattern is configured. In some implementations, for example, the UE 104, the TX processor 468, or the controller/processor 459 may execute the PUCCH component 140 or the PUCCH Tx component 148 to transmit the PUCCH transmission 750 with repetition and frequency hopping based on whether the enhanced PUCCH frequency hopping pattern is configured. In some implementations, at sub-block 1242, the block 1240 optionally includes determining a timing of multiple frequency hops based on the enhanced PUCCH frequency hopping pattern. In some implementations, at sub-block 1244, the block 1240 optionally includes determining a frequency change for each hop based on index $r_{PUCCH}$. Accordingly, the UE 104, the TX processor 468, or the controller/processor 459 executing the PUCCH component 140 or the PUCCH Tx component 148 may provide means for transmitting a PUCCH with repetition and frequency hopping based on whether the enhanced PUCCH frequency hopping pattern is configured.

Figure 13:
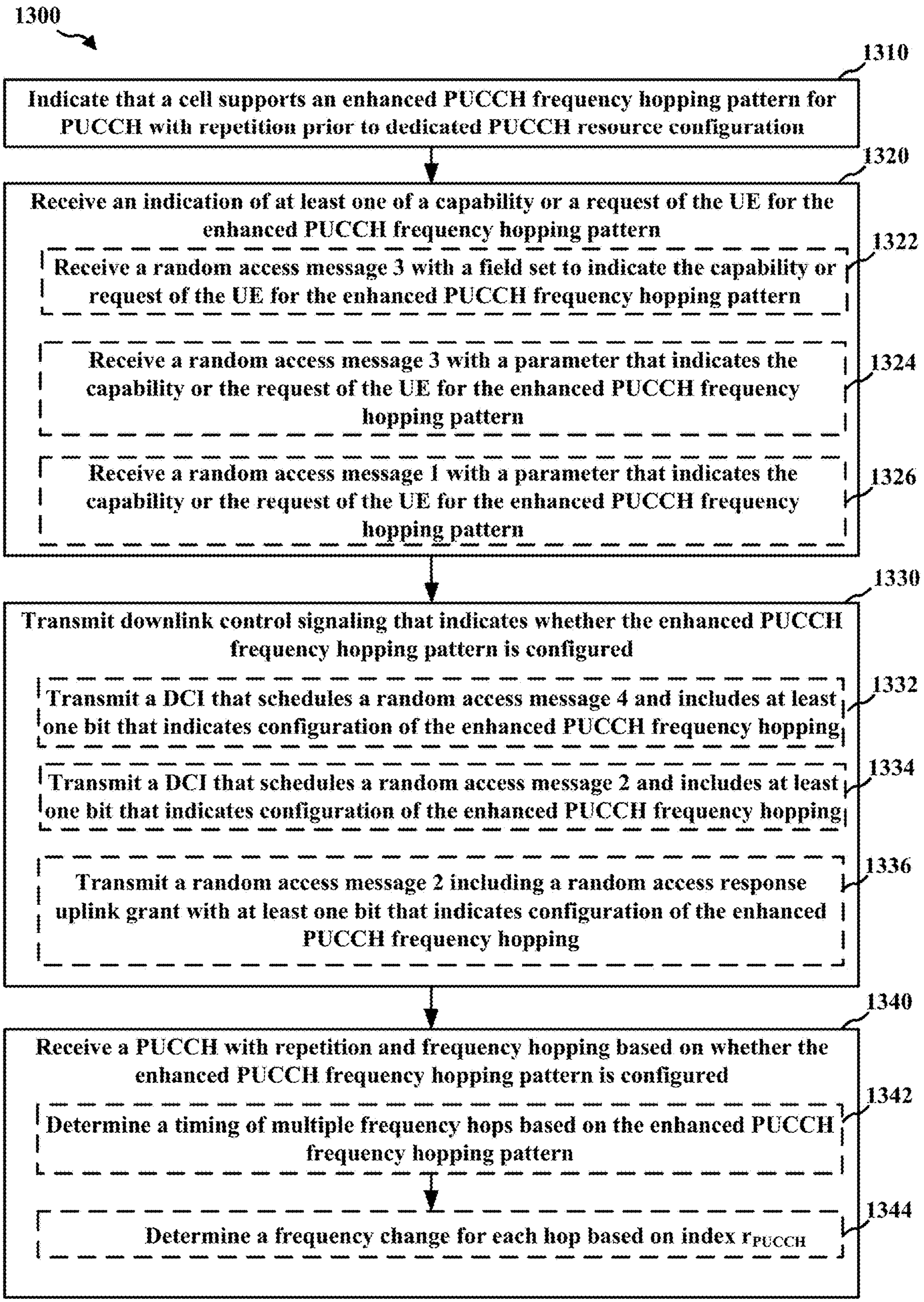
FIG. 13 is a flowchart of an example method 1200 for a base station to receive a PUCCH with repetition and frequency hopping prior to dedicated PUCCH resource configuration.

FIG. 13 is a flowchart of an example method 1300 for a base station to receive a PUCCH with repetition and frequency hopping prior to dedicated PUCCH resource configuration. The method 1300 may be performed by a base station (such as the base station 102, which may include the memory 476 and which may be the entire base station 102 or a component of the base station 102 such as the configuration component 120, the TX processor 416, the RX processor 470, or the controller/processor 475). The method 1300 may be performed by the configuration component 120 in communication with the PUCCH component 140 of the UE 104.

At block 1310, the method 1300 includes indicating that a cell supports an enhanced PUCCH frequency hopping pattern for PUCCH with repetition prior to dedicated PUCCH resource configuration. In some implementations, for example, the base station 102, the TX processor 416, or the controller/processor 475 may execute the configuration component 120 or the support component 122 to indicate that a cell supports an enhanced PUCCH frequency hopping pattern for PUCCH with repetition prior to dedicated PUCCH resource configuration. For example, the support component 122 may transmit the indication 710 to indicate support for the enhanced PUCCH frequency hopping pattern for PUCCH with repetition prior to dedicated PUCCH resource configuration. Accordingly, the base station 102, the TX processor 416, or the controller/processor 475 executing the configuration component 120 or the support component 122 may provide means for indicating that a cell supports an enhanced PUCCH frequency hopping pattern for PUCCH with repetition prior to dedicated PUCCH resource configuration.

At block 1320, the method 1300 includes receiving an indication of at least one of a capability or a request of a UE for the enhanced PUCCH frequency hopping pattern. In some implementations, for example, the base station 102, the RX processor 470, or the controller/processor 475 may execute the configuration component 120 or the capability component 124 to receive an indication of at least one of a capability or a request 720 of a UE for the enhanced PUCCH frequency hopping pattern. In some implementations, the indication of at least one of the capability or the request 720 of the UE for the enhanced PUCCH frequency hopping pattern is an indication of a capability or a request for both PUCCH repetition and the enhanced PUCCH frequency hopping pattern.

In some implementations, at sub-block 1322, the block 1320 may optionally include receiving a random access message 3 with a field set to indicate the capability or request of the UE for the enhanced PUCCH frequency hopping pattern. For example, the field may be one of: a LCID code point for an UL CCCH; a value in a UL-CCH1-MessageType within a UL-CCH1Message class; a reserved bit in a MAC subheader for UL CCCH data; a spare bit in a RRC connection request message or an RRC connection resume request; an identifier of the user equipment; or a value of a RRC information element.

In some implementations, at sub-block 1324, the block 1320 may optionally include receiving a random access message 3 with a parameter that indicates the capability or the request of the UE for the enhanced PUCCH frequency hopping pattern. For example, the parameter may be one or more of: a DMRS port, a DMRS sequence, or a PUSCH scrambling ID.

In some implementations, at sub-block 1326, the block 1320 may optionally include receiving a random access message 1 with a parameter that indicates the capability or the request of the UE for the enhanced PUCCH frequency hopping pattern. For example, the parameter may be one of: a PRACH format, a subset of PRACH sequences, or a subset of RACH occasions.

Accordingly, the base station 102, the RX processor 470, or the controller/processor 475 executing the configuration component 120 or the capability component 124 may provide means for receiving an indication of at least one of a capability or a request of a UE for the enhanced PUCCH frequency hopping pattern.

At block 1330, the method 1300 includes transmitting downlink control signaling that indicates whether the enhanced PUCCH frequency hopping pattern is configured. In some implementations, for example, the base station 102, the TX processor 416, or the controller/processor 475 may execute the configuration component 120 or the pattern configuration component 126 to transmit downlink control signaling 730 that indicates whether the enhanced PUCCH frequency hopping pattern is configured. In some implementations, at sub-block 1332, the block 1330 may optionally include transmitting a DCI that schedules a random access message 4 and includes at least one bit that indicates configuration of the enhanced PUCCH frequency hopping. In some implementations, the DCI is in DCI format 1_0 with the CRC scrambled by TC-RNTI. In some implementations, at sub-block 1334, the block 1330 may optionally include transmitting a DCI that schedules a random access message 2 and includes at least one bit that indicates configuration of the enhanced PUCCH frequency hopping. In some aspect, the DCI is in DCI format 1_0 with CRC scrambled by RA-RNTI. In some implementations, at sub-block 1336, the block 1330 may optionally include transmitting a random access message 2 including a random access response uplink grant with at least one bit that indicates configuration of the enhanced PUCCH frequency hopping. Accordingly, the base station 102, the TX processor 416, or the controller/processor 475 executing the configuration component 120 or the pattern configuration component 126 may provide means for transmitting downlink control signaling that indicates whether the enhanced PUCCH frequency hopping pattern is configured. In some implementations, for a PDSCH that is transmitted prior to dedicated PUCCH resource configuration and that is other than a message 4 or a message B, the corresponding PUCCH follows the indication of the enhanced PUCCH frequency hopping pattern at block 1330. In some aspect, the PDSCH may carry an RRCSetup message or an RRCResume message.

At block 1340, the method 1300 includes receiving a PUCCH with repetition and frequency hopping based on whether the enhanced PUCCH frequency hopping pattern is configured. In some implementations, for example, the base station 102, the RX processor 470, or the controller/processor 475 may execute the configuration component 120 or the PUCCH Rx component 128 to receive a PUCCH transmission 750 with repetition and frequency hopping based on whether the enhanced PUCCH frequency hopping pattern is configured. In some implementations, at sub-block 1342, the block 1340 optionally includes determining a timing of multiple frequency hops based on the enhanced PUCCH frequency hopping pattern. In some implementations, at sub-block 1344, the block 1340 optionally includes determining a frequency change for each hop based on index $r_{PUCCH}$. Accordingly, the base station 102, the RX processor 470, or the controller/processor 475 executing the configuration component 120 or the PUCCH Rx component 128 may provide means for receiving a PUCCH with repetition and frequency hopping based on whether the enhanced PUCCH frequency hopping pattern is configured.

Figure 14:
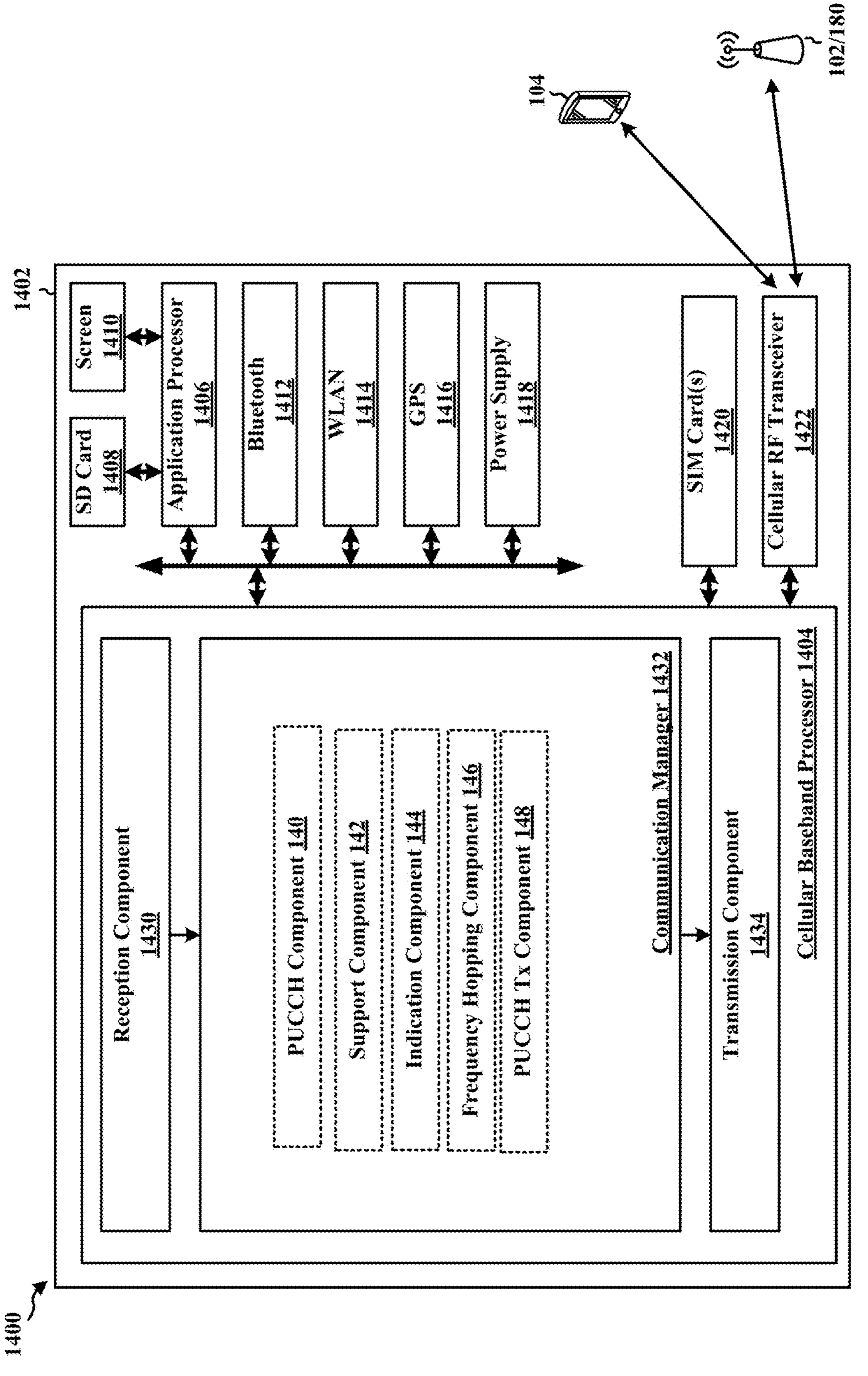
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE or similar device, or the apparatus 1402 may be a component of a UE or similar device. The apparatus 1402 may include a cellular baseband processor 1404 (also referred to as a modem) and/or a cellular RF transceiver 1422, which may be coupled together and/or integrated into the same package, component, circuit, chip, and/or other circuitry.

In an aspect, the apparatus 1402 may accept or may include one or more subscriber identity modules (SIM) cards 1420, which may include one or more integrated circuits, chips, or similar circuitry, and which may be removable or embedded. The one or more SIM cards 1420 may carry identification and/or authentication information, such as an international mobile subscriber identity (IMSI) and/or IMSI-related key(s). Further, the apparatus 1402 may include one or more of an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418.

The cellular baseband processor 1404 communicates through the cellular RF transceiver 1422 with the UE 104 and/or base station 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404.

In the context of FIG. 4, the cellular baseband processor 1404 may be a component of the UE 450 and may include the memory 460 and/or at least one of the TX processor 468, the RX processor 456, and/or the controller/processor 459. In one configuration, the apparatus 1402 may be a modem chip and/or may be implemented as the cellular baseband processor 1404, while in another configuration, the apparatus 1402 may be the entire UE (e.g., the UE 450 of FIG. 4, the UE 504 in FIGS. 5-7) and may include some or all of the abovementioned components, circuits, chips, and/or other circuitry illustrated in the context of the apparatus 1402. In one configuration, the cellular RF transceiver 1422 may be implemented as at least one of the transmitter 454TX and/or the receiver 454RX.

The reception component 1430 may be configured to receive signaling on a wireless channel, such as signaling from a base station 102/180 or UE 104. The transmission component 1434 may be configured to transmit signaling on a wireless channel, such as signaling to a base station 102/180 or UE 104. The communication manager 1432 may coordinate or manage some or all wireless communications by the apparatus 1402, including across the reception component 1430 and the transmission component 1434.

The reception component 1430 may provide some or all data and/or control information included in received signaling to the communication manager 1432, and the communication manager 1432 may generate and provide some or all of the data and/or control information to be included in transmitted signaling to the transmission component 1434. The communication manager 1432 may include the various illustrated components, including one or more components configured to process received data and/or control information, and/or one or more components configured to generate data and/or control information for transmission.

The communication manager 1432 includes a PUCCH component 140 that is configured to transmit a PUCCH with an enhanced frequency hopping pattern prior to dedicated configuration. The communication manager 1432 includes a support component 142 configured to receive an indication that a cell supports an enhanced physical uplink control channel (PUCCH) frequency hopping pattern for PUCCH with repetition prior to dedicated PUCCH resource configuration. The communication manager 1432 includes an indication component 144 configured to indicate at least one of a capability or a request of the UE for the enhanced PUCCH frequency hopping pattern. The communication manager 1432 includes a frequency hopping component 146 configured to receive downlink control signaling that indicates whether the enhanced PUCCH frequency hopping pattern is configured. The communication manager 1432 includes a PUCCH Tx component 148 configured to transmit a PUCCH with repetition and frequency hopping based on whether the enhanced PUCCH frequency hopping pattern is configured.

The apparatus 1402 may include additional components that perform some or all of the blocks, operations, signaling, etc. of the algorithm(s) in the aforementioned call flow diagram(s) and/or flowchart(s) of FIGS. 7 and 12. As such, some or all of the blocks, operations, signaling, etc. in the aforementioned call flow diagram(s) and/or flowchart(s) of FIGS. 7 and 12 may be performed by one or more components and the apparatus 1402 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, may include means for determining that a cell supports an enhanced PUCCH frequency hopping pattern for PUCCH with repetition prior to dedicated PUCCH resource configuration, e.g., as described in connection with block 1210 from FIG. 12; means for indicating at least one of a capability or a request of the UE for the enhanced PUCCH frequency hopping pattern, e.g., as described in connection with block 1220 from FIG. 12; means for receiving downlink control signaling that indicates whether the enhanced PUCCH frequency hopping pattern is configured, e.g., as described in connection with block 1230 from FIG. 12; and means for transmitting a PUCCH with repetition and frequency hopping based on whether the enhanced PUCCH frequency hopping pattern is configured, e.g., as described in connection with block 1240 from FIG. 12.

The aforementioned means may be one or more of the aforementioned components of the apparatus 1402 configured to perform the functions recited by the aforementioned means. As described supra, the apparatus 1402 may include the TX processor 468, the RX processor 456, and the controller/processor 459. As such, in one configuration, the aforementioned means may be the TX processor 468, the RX processor 456, and the controller/processor 459 configured to perform the functions recited by the aforementioned means.

Figure 15:
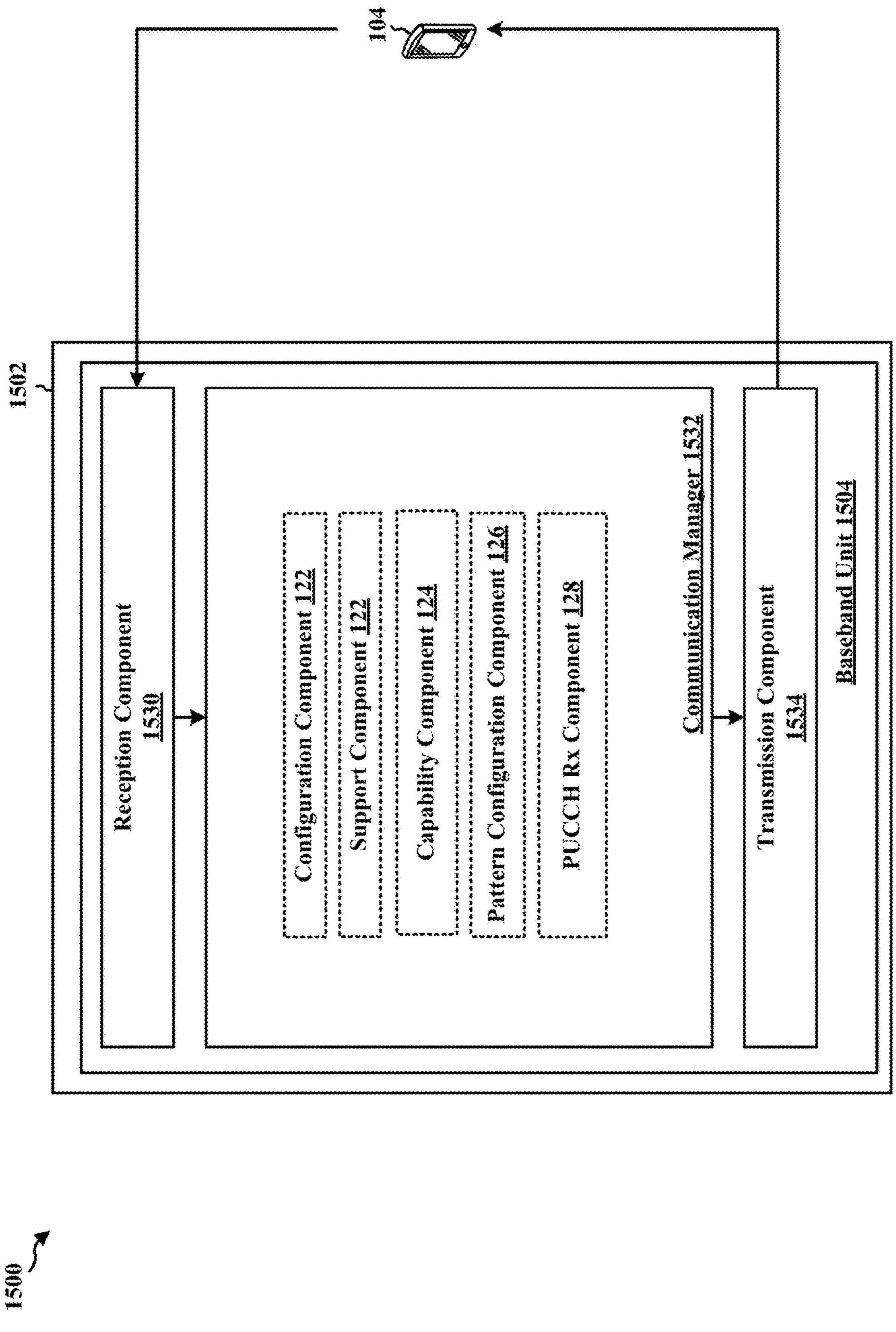
FIG. 15 is a diagram illustrating another example of a hardware implementation for another example apparatus.

FIG. 15 is a diagram 1500 illustrating an example of a hardware implementation for an apparatus 1502. The apparatus 1502 may be a base station or similar device or system, or the apparatus 1502 may be a component of a base station or similar device or system. The apparatus 1502 may include a baseband unit 1504. The baseband unit 1504 may communicate through a cellular RF transceiver. For example, the baseband unit 1504 may communicate through a cellular RF transceiver with a UE 104, such as for downlink and/or uplink communication, and/or with a base station 102/180, such as for IAB.

The baseband unit 1504 may include a computer-readable medium/memory, which may be non-transitory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 410 and may include the memory 476 and/or at least one of the TX processor 416, the RX processor 470, and the controller/processor 475.

The reception component 1530 may be configured to receive signaling on a wireless channel, such as signaling from a UE 104 or base station 102/180. The transmission component 1534 may be configured to transmit signaling on a wireless channel, such as signaling to a UE 104 or base station 102/180. The communication manager 1532 may coordinate or manage some or all wireless communications by the apparatus 1502, including across the reception component 1530 and the transmission component 1534.

The reception component 1530 may provide some or all data and/or control information included in received signaling to the communication manager 1532, and the communication manager 1532 may generate and provide some or all of the data and/or control information to be included in transmitted signaling to the transmission component 1534. The communication manager 1532 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1532 includes a configuration component 120 that is configured to receive a PUCCH with an enhanced frequency hopping pattern prior to dedicated configuration. The communication manager 1532 includes a support component 122 configured to indicate that a cell supports an enhanced physical uplink control channel (PUCCH) frequency hopping pattern for PUCCH with repetition prior to dedicated PUCCH resource configuration. The communication manager 1532 includes a capability component 124 configured to receive an indication of at least one of a capability or a request of a user equipment (UE) for the enhanced PUCCH frequency hopping pattern. The communication manager 1532 includes a pattern configuration component 126 configured to transmit downlink control signaling that indicates whether the enhanced PUCCH frequency hopping pattern is configured. The communication manager 1532 includes a PUCCH Rx component 128 configured to receive a PUCCH with repetition and frequency hopping based on whether the enhanced PUCCH frequency hopping pattern is configured.

The apparatus 1502 may include additional components that perform some or all of the blocks, operations, signaling, etc. of the algorithm(s) in the aforementioned call flow diagram(s) and/or flowchart(s) of FIGS. 7 and 13. As such, some or all of the blocks, operations, signaling, etc. in the aforementioned call flow diagram(s) and/or flowchart(s) of FIGS. 7 and 13 may be performed by a component and the apparatus 1502 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, may include means for indicating that a cell supports an enhanced physical uplink control channel (PUCCH) frequency hopping pattern for PUCCH with repetition prior to dedicated PUCCH resource configuration, e.g., as described in connection with block 1310 from FIG. 13; means for receiving an indication of at least one of a capability or a request of a user equipment (UE) for the enhanced PUCCH frequency hopping pattern, e.g., as described in connection with block 1320 from FIG. 13; means for transmitting downlink control signaling that indicates whether the enhanced PUCCH frequency hopping pattern is configured, e.g., as described in connection with block 1330 from FIG. 13; and means for receiving a PUCCH with repetition and frequency hopping based on whether the enhanced PUCCH frequency hopping pattern is configured, e.g., as described in connection with block 1340 from FIG. 13.

The aforementioned means may be one or more of the aforementioned components of the apparatus 1502 configured to perform the functions recited by the aforementioned means. As described supra, the apparatus 1502 may include the TX processor 416, the RX processor 470, and the controller/processor 475. As such, in one configuration, the aforementioned means may be the TX processor 416, the RX processor 470, and the controller/processor 475 configured to perform the functions recited by the aforementioned means.

As described in further detail in the present disclosure, PUCCH repetition with frequency hopping may be performed to increase coverage extension during random access procedures. In particular, a UE may perform repetition and frequency hopping on a PUCCH transmission that contains a HARQ-ACK feedback for a contention resolution PDSCH transmission in a random access procedure. Accordingly. PUCCH transmissions may be transmitted with repetition and frequency hopping on resources prior to activation of a dedicated PUCCH resource configuration to improve likelihood of correct reception of such PUCCH transmissions.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

SOME ADDITIONAL EXAMPLES

Aspect 1: A method of wireless communication at a user equipment (UE), comprising: determining that a cell supports an enhanced physical uplink control channel (PUCCH) frequency hopping pattern for PUCCH with repetition prior to dedicated PUCCH resource configuration; indicating at least one of a capability or a request of the UE for the enhanced PUCCH frequency hopping pattern; receiving downlink control signaling that indicates whether the enhanced PUCCH frequency hopping pattern is configured; and transmitting a PUCCH with repetition and frequency hopping based on whether the enhanced PUCCH frequency hopping pattern is configured.

Aspect 2: The method of Aspect 1, wherein the enhanced PUCCH frequency hopping pattern includes intra-slot frequency hopping in every slot of the PUCCH with repetition.

Aspect 3: The method of Aspect 1, wherein the enhanced PUCCH frequency hopping pattern includes intra-slot frequency hopping in one slot of the PUCCH with repetition.

Aspect 4: The method of any of Aspects 1-3, wherein the enhanced PUCCH frequency hopping pattern includes inter-slot frequency hopping between slots or time domain windows of the PUCCH with repetition.

Aspect 5: The method of any of Aspects 1-4, wherein indicating at least one of the capability or the request of the UE for the enhanced PUCCH frequency hopping pattern includes transmitting a random access message 3 with a field set to indicate the capability or the request of the UE for the enhanced PUCCH frequency hopping pattern.

Aspect 6: The method of Aspect 5, wherein the field is a logical channel identifier (LCID) code point for an uplink common control channel (UL CCCH).

Aspect 7: The method of Aspect 5, wherein the field is a value in a UL-CCH1-MessageType within a UL-CCH1Message class.

Aspect 8: The method of Aspect 5, wherein the field is a reserved bit in a MAC subheader for UL CCCH data.

Aspect 9: The method of Aspect 5, wherein the field is a spare bit in a radio resource control (RRC) connection request message or an RRC connection resume request.

Aspect 10: The method of Aspect 5, wherein the field is an identifier of the UE.

Aspect 11: The method of Aspect 5, wherein the field is a value of a RRC information element.

Aspect 12: The method of any of Aspects 1-4, wherein indicating at least one of the capability or the request of the UE for the enhanced PUCCH frequency hopping pattern includes transmitting a random access message 3 with a parameter that indicates the capability or the request of the UE for the enhanced PUCCH frequency hopping pattern.

Aspect 13: The method of Aspect 12, wherein the parameter is a demodulation reference signal (DMRS) port.

Aspect 14: The method of Aspect 12, wherein the parameter is a DMRS sequence.

Aspect 15: The method of Aspect 12, wherein the parameter is a physical uplink shared channel (PUSCH) scrambling ID.

Aspect 16: The method of any of Aspects 1-4, wherein indicating at least one of the capability or the request of the UE for the enhanced PUCCH frequency hopping pattern comprises transmitting a random access message 1 with a parameter that indicates the capability or the request of the UE for the enhanced PUCCH frequency hopping pattern.

Aspect 17: The method of Aspect 16, wherein the parameter is one of: a physical random access channel (PRACH) format, a subset of PRACH sequences, or a subset of RACH occasions.

Aspect 18: The method of any of Aspects 1-17, wherein indicating at least one of the capability or the request of the UE for enhanced PUCCH frequency hopping pattern further indicates a PUCCH repetition capability or request.

Aspect 19: The method of any of Aspects 1-18, wherein receiving downlink control signaling that indicates whether the enhanced PUCCH frequency hopping pattern is configured comprises receiving a downlink control information (DCI) that schedules a random access message 4 and includes at least one bit that indicates configuration of the enhanced PUCCH frequency hopping.

Aspect 20: The method of any of Aspects 1-18, wherein receiving downlink control signaling that indicates whether the enhanced PUCCH frequency hopping pattern is configured comprises receiving a DCI that schedules a random access message 2 and includes at least one bit that indicates configuration of the enhanced PUCCH frequency hopping pattern.

Aspect 21: The method of any of Aspects 1-18, wherein receiving downlink control signaling that indicates whether the enhanced PUCCH frequency hopping pattern is configured comprises receiving a random access message 2 including a random access response uplink grant with at least one bit that indicates configuration of the enhanced PUCCH frequency hopping pattern.

Aspect 22: The method of any of Aspects 1-21, wherein transmitting the PUCCH with repetition and frequency hopping comprises: determining a timing of multiple frequency hops based on the enhanced PUCCH frequency hopping pattern; and determining a frequency change for each hop based on index $r_{PUCCH}$.

Aspect 23: The method of any of Aspects 1-22, wherein the PUCCH includes a hybrid automatic repeat request (HARQ) acknowledgment (ACK) of a random access message 4 or a HARQ ACK of an RRC message.

Aspect 24: A method of wireless communication at a base station, comprising: indicating that a cell supports an enhanced physical uplink control channel (PUCCH) frequency hopping pattern for PUCCH with repetition prior to dedicated PUCCH resource configuration; receiving an indication of at least one of a capability or a request of a user equipment (UE) for the enhanced PUCCH frequency hopping pattern; transmitting downlink control signaling that indicates whether the enhanced PUCCH frequency hopping pattern is configured; and receiving a PUCCH with repetition and frequency hopping based on whether the enhanced PUCCH frequency hopping pattern is configured.

Aspect 25: The method of Aspect 24, wherein the enhanced PUCCH frequency hopping pattern includes intra-slot frequency hopping in every slot of the PUCCH with repetition.

Aspect 26: The method of Aspect 24, wherein the enhanced PUCCH frequency hopping pattern includes intra-slot frequency hopping in one slot of the PUCCH with repetition.

Aspect 27: The method of any of Aspects 24-26, wherein the enhanced PUCCH frequency hopping pattern includes inter-slot frequency hopping between slots or time domain windows of the PUCCH with repetition.

Aspect 28: The method of any of Aspects 24-27, wherein the indication of at least one of the capability or the request of the UE for the enhanced PUCCH frequency hopping pattern includes a random access message 3 with a field set to indicate the capability or the request of the UE for the enhanced PUCCH frequency hopping pattern.

Aspect 29: The method of Aspect 28, wherein the field is an LCID code point for an uplink common control channel (UL CCCH).

Aspect 30: The method of Aspect 28, wherein the field is a value in a UL-CCH1-MessageType within a UL-CCH1Message class.

Aspect 31: The method of Aspect 28, wherein the field is a reserved bit in a MAC subheader for UL CCCH data.

Aspect 32: The method of Aspect 28, wherein the field is a spare bit in a radio resource control (RRC) connection request message or an RRC connection resume request.

Aspect 33: The method of Aspect 28, wherein the field is an identifier of the UE.

Aspect 34: The method of Aspect 28, wherein the field is a value of a RRC information element.

Aspect 35: The method of any of Aspects 24-27, wherein the indication of at least one of the capability or the request of the UE for the enhanced PUCCH frequency hopping pattern includes a random access message 3 with a parameter that indicates the capability or the request of the UE for the enhanced PUCCH frequency hopping pattern.

Aspect 36: The method of Aspect 35, wherein the parameter is a demodulation reference signal (DMRS) port.

Aspect 37: The method of Aspect 35, wherein the parameter is a DMRS sequence.

Aspect 38: The method of Aspect 35, wherein the parameter is a physical uplink shared channel (PUSCH) scrambling ID.

Aspect 39: The method of any of Aspects 24-27, wherein the indication of at least one of the capability or the request of the UE for the enhanced PUCCH frequency hopping pattern is a random access message 1 with a parameter that indicates the capability or the request of the UE for the enhanced PUCCH frequency hopping pattern.

Aspect 40: The method of Aspect 39, wherein the parameter is one of: a physical random access channel (PRACH) format, a subset of PRACH sequences, or a subset of RACH occasions.

Aspect 41: The method of any of Aspects 24-40, wherein the indication of at least one of the capability or the request of the UE for the enhanced PUCCH frequency hopping pattern is an indication of a capability or a request for both PUCCH repetition and the enhanced PUCCH frequency hopping pattern.

Aspect 42: The method of any of Aspects 24-40, wherein transmitting downlink control signaling that indicates whether the enhanced PUCCH frequency hopping pattern is configured comprises transmitting a downlink control information (DCI) that schedules a random access message 4 and includes at least one bit that indicates configuration of the enhanced PUCCH frequency hopping pattern.

Aspect 43: The method of any of Aspects 24-40, wherein transmitting downlink control signaling that indicates whether the enhanced PUCCH frequency hopping pattern is configured comprises transmitting a DCI that schedules a random access message 2 and includes at least one bit that indicates configuration of the enhanced PUCCH frequency hopping pattern.

Aspect 44: The method of any of Aspects 24-40, wherein transmitting downlink control signaling that indicates whether the enhanced PUCCH frequency hopping pattern is configured comprises transmitting a random access message 2 that includes a random access response uplink grant with at least one bit that indicates configuration of the enhanced PUCCH frequency hopping pattern.

Aspect 45: The method of any of Aspects 24-44, wherein receiving the PUCCH with repetition and frequency hopping comprises: determining a timing of multiple frequency hops based on the enhanced PUCCH frequency hopping pattern; and determining a frequency change for each hop based on index $r_{PUCCH}$.

Aspect 46: The method of any of Aspects 24-45, wherein the PUCCH includes a hybrid automatic repeat request (HARQ) acknowledgment (ACK) of a random access message 4 or a HARQ ACK of an RRC message.

Aspect 47: An apparatus for wireless communication at a user equipment (UE), comprising: one or more memories; and one or more processors coupled to the one or more memories and, individually or in combination, configured to: determine that a cell supports an enhanced physical uplink control channel (PUCCH) frequency hopping pattern for PUCCH with repetition prior to dedicated PUCCH resource configuration; indicate at least one of a capability or a request of the UE for the enhanced PUCCH frequency hopping pattern; receive downlink control signaling that indicates whether the enhanced PUCCH frequency hopping pattern is configured; and transmit a PUCCH with repetition and frequency hopping based on whether the enhanced PUCCH frequency hopping pattern is configured.

Aspect 48: The apparatus of Aspect 47, wherein the enhanced PUCCH frequency hopping pattern includes intra-slot frequency hopping in every slot of the PUCCH with repetition.

Aspect 49: The apparatus of Aspect 47, wherein the enhanced PUCCH frequency hopping pattern includes intra-slot frequency hopping in one slot of the PUCCH with repetition.

Aspect 50: The apparatus of any of Aspects 47-49, wherein the enhanced PUCCH frequency hopping pattern includes inter-slot frequency hopping between slots or time domain windows of the PUCCH with repetition.

Aspect 51: The apparatus of any of Aspects 47-50, wherein to indicate at least one of the capability or the request of the UE for the enhanced PUCCH frequency hopping pattern, the one or more processors, individually or in combination, are configured to transmit a random access message 3 with a field set to indicate the capability or the request of the UE for the enhanced PUCCH frequency hopping pattern.

Aspect 52: The apparatus of Aspect 51, wherein the field is a logical channel identifier (LCID) code point for an uplink common control channel (UL CCCH).

Aspect 53: The apparatus of Aspect 51, wherein the field is a value in a UL-CCH1-MessageType within a UL-CCH1Message class.

Aspect 54: The apparatus of Aspect 51, wherein the field is a reserved bit in a MAC subheader for UL CCCH data.

Aspect 55: The apparatus of Aspect 51, wherein the field is a spare bit in a radio resource control (RRC) connection request message or an RRC connection resume request.

Aspect 56: The apparatus of Aspect 51, wherein the field is an identifier of the UE.

Aspect 57: The apparatus of Aspect 51, wherein the field is a value of a RRC information element.

Aspect 58: The apparatus of any of Aspects 47-50, wherein to indicate at least one of the capability or the request of the UE for the enhanced PUCCH frequency hopping pattern, the one or more processors, individually or in combination, are configured to transmit a random access message 3 with a parameter that indicates the capability or the request of the UE for the enhanced PUCCH frequency hopping pattern.

Aspect 59: The apparatus of Aspect 58, wherein the parameter is a demodulation reference signal (DMRS) port.

Aspect 60: The apparatus of Aspect 58, wherein the parameter is a DMRS sequence.

Aspect 61: The apparatus of Aspect 58, wherein the parameter is a physical uplink shared channel (PUSCH) scrambling ID.

Aspect 62: The apparatus of any of Aspects 47-50, wherein to indicate at least one of the capability or the request of the UE for the enhanced PUCCH frequency hopping pattern, the one or more processors, individually or in combination, are configured to transmit a random access message 1 with a parameter that indicates the capability or the request of the UE for the enhanced PUCCH frequency hopping pattern.

Aspect 63: The apparatus of Aspect 62, wherein the parameter is one of: a physical random access channel (PRACH) format, a subset of PRACH sequences, or a subset of RACH occasions.

Aspect 64: The apparatus of any of Aspects 47-63, wherein indicating at least one of the capability or the request of the UE for enhanced PUCCH frequency hopping pattern further indicates a PUCCH repetition capability or request.

Aspect 65: The apparatus of any of Aspects 47-64, wherein to receive the downlink control signaling that indicates whether the enhanced PUCCH frequency hopping pattern is configured, the one or more processors, individually or in combination, are configured to receive a downlink control information (DCI) that schedules a random access message 4 and includes at least one bit that indicates configuration of the enhanced PUCCH frequency hopping.

Aspect 66: The apparatus of any of Aspects 47-64, wherein to receive the downlink control signaling that indicates whether the enhanced PUCCH frequency hopping pattern is configured, the one or more processors, individually or in combination, are configured to receive a DCI that schedules a random access message 2 and includes at least one bit that indicates configuration of the enhanced PUCCH frequency hopping pattern.

Aspect 67: The apparatus of any of Aspects 47-64, wherein to receive the downlink control signaling that indicates whether the enhanced PUCCH frequency hopping pattern is configured, the one or more processors, individually or in combination, are configured to receive a random access message 2 including a random access response uplink grant with at least one bit that indicates configuration of the enhanced PUCCH frequency hopping pattern.

Aspect 68: The apparatus of any of Aspects 47-67, wherein to transmit the PUCCH with repetition and frequency hopping, the one or more processors, individually or in combination, are configured to: determine a timing of multiple frequency hops based on the enhanced PUCCH frequency hopping pattern; and determine a frequency change for each hop based on index $r_{PUCCH}$.

Aspect 69: The apparatus of any of Aspects 47-68, wherein the PUCCH includes a hybrid automatic repeat request (HARQ) acknowledgment (ACK) of a random access message 4 or a HARQ ACK of an RRC message.

Aspect 70: An apparatus of wireless communication at a base station, comprising: one or more memories; and one or more processors coupled to the one or more memories and, individually or in combination, configured to: indicate that a cell supports an enhanced physical uplink control channel (PUCCH) frequency hopping pattern for PUCCH with repetition prior to dedicated PUCCH resource configuration; receive an indication of at least one of a capability or a request of a user equipment (UE) for the enhanced PUCCH frequency hopping pattern; transmit downlink control signaling that indicates whether the enhanced PUCCH frequency hopping pattern is configured; and receive a PUCCH with repetition and frequency hopping based on whether the enhanced PUCCH frequency hopping pattern is configured.

Aspect 71: The apparatus of Aspect 70, wherein the enhanced PUCCH frequency hopping pattern includes intra-slot frequency hopping in every slot of the PUCCH with repetition.

Aspect 72: The apparatus of Aspect 70, wherein the enhanced PUCCH frequency hopping pattern includes intra-slot frequency hopping in one slot of the PUCCH with repetition.

Aspect 73: The apparatus of any of Aspects 70-72, wherein the enhanced PUCCH frequency hopping pattern includes inter-slot frequency hopping between slots or time domain windows of the PUCCH with repetition.

Aspect 74: The apparatus of any of Aspects 70-73, wherein the indication of at least one of the capability or the request of the UE for the enhanced PUCCH frequency hopping pattern includes a random access message 3 with a field set to indicate the capability or the request of the UE for the enhanced PUCCH frequency hopping pattern.

Aspect 75: The apparatus of Aspect 74, wherein the field is an LCID code point for an uplink common control channel (UL CCCH).

Aspect 76: The apparatus of Aspect 74, wherein the field is a value in a UL-CCH1-MessageType within a UL-CCH1Message class.

Aspect 77: The apparatus of Aspect 74, wherein the field is a reserved bit in a MAC subheader for UL CCCH data.

Aspect 78: The apparatus of Aspect 74, wherein the field is a spare bit in a radio resource control (RRC) connection request message or an RRC connection resume request.

Aspect 79: The apparatus of Aspect 74, wherein the field is an identifier of the UE.

Aspect 80: The apparatus of Aspect 74, wherein the field is a value of a RRC information element.

Aspect 81: The apparatus of any of Aspects 70-73, wherein the indication of at least one of the capability or the request of the UE for the enhanced PUCCH frequency hopping pattern includes a random access message 3 with a parameter that indicates the capability or the request of the UE for the enhanced PUCCH frequency hopping pattern.

Aspect 82: The apparatus of Aspect 81, wherein the parameter is a demodulation reference signal (DMRS) port.

Aspect 83: The apparatus of Aspect 81, wherein the parameter is a DMRS sequence.

Aspect 84: The apparatus of Aspect 81, wherein the parameter is a physical uplink shared channel (PUSCH) scrambling ID.

Aspect 85: The apparatus of any of Aspects 70-73, wherein the indication of at least one of the capability or the request of the UE for the enhanced PUCCH frequency hopping pattern is a random access message 1 with a parameter that indicates the capability or the request of the UE for the enhanced PUCCH frequency hopping pattern.

Aspect 86: The apparatus of Aspect 85, wherein the parameter is one of: a physical random access channel (PRACH) format, a subset of PRACH sequences, or a subset of RACH occasions.

Aspect 87: The apparatus of any of Aspects 70-87, wherein the indication of at least one of the capability or the request of the UE for the enhanced PUCCH frequency hopping pattern is an indication of a capability or a request for both PUCCH repetition and the enhanced PUCCH frequency hopping pattern.

Aspect 88: The apparatus of any of Aspects 70-88, wherein to transmit the downlink control signaling that indicates whether the enhanced PUCCH frequency hopping pattern is configured, the one or more processors, individually or in combination, are configured to transmit a downlink control information (DCI) that schedules a random access message 4 and includes at least one bit that indicates configuration of the enhanced PUCCH frequency hopping pattern.

Aspect 89: The apparatus of any of Aspects 70-88, wherein to transmit the downlink control signaling that indicates whether the enhanced PUCCH frequency hopping pattern is configured, the one or more processors, individually or in combination, are configured to transmit a DCI that schedules a random access message 2 and includes at least one bit that indicates configuration of the enhanced PUCCH frequency hopping pattern.

Aspect 90: The apparatus of any of Aspects 70-88, wherein to transmit the downlink control signaling that indicates whether the enhanced PUCCH frequency hopping pattern is configured, the one or more processors, individually or in combination, are configured to transmit a random access message 2 that includes a random access response uplink grant with at least one bit that indicates configuration of the enhanced PUCCH frequency hopping pattern.

Aspect 91: The apparatus of any of Aspects 70-90, wherein to receive the PUCCH with repetition and frequency hopping, the one or more processors, individually or in combination, are configured to: determine a timing of multiple frequency hops based on the enhanced PUCCH frequency hopping pattern; and determine a frequency change for each hop based on index $r_{PUCCH}$.

Aspect 92: The apparatus of any of Aspects 70-91, wherein the PUCCH includes a hybrid automatic repeat request (HARQ) acknowledgment (ACK) of a random access message 4 or a HARQ ACK of an RRC message.

Aspect 93: An apparatus for wireless communication at a user equipment (UE), comprising: means for determining that a cell supports an enhanced physical uplink control channel (PUCCH) frequency hopping pattern for PUCCH with repetition prior to dedicated PUCCH resource configuration; means for indicating at least one of a capability or a request of the UE for the enhanced PUCCH frequency hopping pattern; means for receiving downlink control signaling that indicates whether the enhanced PUCCH frequency hopping pattern is configured; and means for transmitting a PUCCH with repetition and frequency hopping based on whether the enhanced PUCCH frequency hopping pattern is configured.

Aspect 94: An apparatus for wireless communication, comprising: means for indicating that a cell supports an enhanced physical uplink control channel (PUCCH) frequency hopping pattern for PUCCH with repetition prior to dedicated PUCCH resource configuration; means for receiving an indication of at least one of a capability or a request of a user equipment (UE) for the enhanced PUCCH frequency hopping pattern; means for transmitting downlink control signaling that indicates whether the enhanced PUCCH frequency hopping pattern is configured; and means for receiving a PUCCH with repetition and frequency hopping based on whether the enhanced PUCCH frequency hopping pattern is configured.

Aspect 95: A non-transitory computer-readable medium storing computer-executable code, the code when executed by a processor of a user equipment (UE) causes the processor to: determine that a cell supports an enhanced physical uplink control channel (PUCCH) frequency hopping pattern for PUCCH with repetition prior to dedicated PUCCH resource configuration; indicate at least one of a capability or a request of the UE for the enhanced PUCCH frequency hopping pattern; receive downlink control signaling that indicates whether the enhanced PUCCH frequency hopping pattern is configured; and transmit a PUCCH with repetition and frequency hopping based on whether the enhanced PUCCH frequency hopping pattern is configured.

Aspect 96: A non-transitory computer-readable medium storing computer-executable code, the code when executed by a processor causes the processor to: indicate that a cell supports an enhanced physical uplink control channel (PUCCH) frequency hopping pattern for PUCCH with repetition prior to dedicated PUCCH resource configuration; receive an indication of at least one of a capability or a request of a user equipment (UE) for the enhanced PUCCH frequency hopping pattern; transmit downlink control signaling that indicates whether the enhanced PUCCH frequency hopping pattern is configured; and receive a PUCCH with repetition and frequency hopping based on whether the enhanced PUCCH frequency hopping pattern is configured.

The aspects described herein additionally include one or more of the following implementation examples described in the following numbered clauses.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated.

For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

What is claimed is:

1. An apparatus for wireless communication at a user equipment (UE), comprising:

one or more memories; and one or more processors coupled to the one or more memories and, individually or in combination, configured to:

receive an indication that a cell supports an enhanced physical uplink control channel (PUCCH) frequency hopping pattern for a PUCCH with repetition prior to dedicated PUCCH resource configuration;

indicate at least one of a capability or a request of the UE for the enhanced PUCCH frequency hopping pattern, wherein to indicate at least one of the capability or the request of the UE for the enhanced PUCCH frequency hopping pattern, the one or more processors, individually or in combination, are configured to transmit a random access message 3 with a field set to indicate the capability or the request of the UE for the enhanced PUCCH frequency hopping pattern, wherein the field is one of:

a logical channel identifier (LCID) code point for an uplink common control channel (UL CCCH);

a value in a UL-CCH1-MessageType within a UL-CCH1Message class;

a spare bit in a radio resource control (RRC) connection request message or an RRC connection resume request;

an identifier of the UE; or a value of a RRC information element;

receive downlink control signaling that indicates whether the enhanced PUCCH frequency hopping pattern is configured; and transmit the PUCCH with repetition and frequency hopping based on whether the enhanced PUCCH frequency hopping pattern is configured.

2. The apparatus of claim 1, wherein the enhanced PUCCH frequency hopping pattern includes intra-slot frequency hopping in every slot of the PUCCH with repetition.

3. The apparatus of claim 1, wherein the enhanced PUCCH frequency hopping pattern includes intra-slot frequency hopping in exactly one slot of the PUCCH with repetition.

4. The apparatus of claim 1, wherein the enhanced PUCCH frequency hopping pattern includes inter-slot frequency hopping between slots or time domain windows of the PUCCH with repetition.

5. The apparatus of claim 1, wherein indicating at least one of the capability or the request of the UE for enhanced PUCCH frequency hopping pattern further indicates a PUCCH repetition capability or request.

6. The apparatus of claim 1, wherein to receive the downlink control signaling that indicates whether the enhanced PUCCH frequency hopping pattern is configured, the one or more processors, individually or in combination, are configured to receive a downlink control information (DCI) that schedules a random access message 4 and includes at least one bit that indicates configuration of the enhanced PUCCH frequency hopping pattern.

7. The apparatus of claim 1, wherein to receive the downlink control signaling that indicates whether the enhanced PUCCH frequency hopping pattern is configured, the one or more processors, individually or in combination, are configured to receive a DCI that schedules a random access message 2 and includes at least one bit that indicates configuration of the enhanced PUCCH frequency hopping pattern.

8. The apparatus of claim 1, wherein to receive the downlink control signaling that indicates whether the enhanced PUCCH frequency hopping pattern is configured, the one or more processors, individually or in combination, are configured to receive a random access message 2 including a random access response uplink grant with at least one bit that indicates configuration of the enhanced PUCCH frequency hopping pattern.

9. The apparatus of claim 1, wherein to transmit the PUCCH with repetition and frequency hopping, the one or more processors, individually or in combination, are configured to:

determine a timing of multiple frequency hops based on the enhanced PUCCH frequency hopping pattern; and determine a frequency change for each hop based on index $r_{PUCCH}$.

10. The apparatus of claim 1, wherein the PUCCH includes a hybrid automatic repeat request (HARQ) acknowledgment (ACK) of a random access message 4 or a HARQ ACK of an RRC message.

11. An apparatus of wireless communication at a base station, comprising:

one or more memories; and one or more processors coupled to the one or more memories and, individually or in combination, configured to:

indicate that a cell supports an enhanced physical uplink control channel (PUCCH) frequency hopping pattern for a PUCCH with repetition prior to dedicated PUCCH resource configuration;

receive an indication of at least one of a capability or a request of a user equipment (UE) for the enhanced PUCCH frequency hopping pattern, wherein the indication of at least one of the capability or the request of the UE for the enhanced PUCCH frequency hopping pattern includes a random access message 3 with a field set to indicate the capability or the request of the UE for the enhanced PUCCH frequency hopping pattern, wherein the field is one of:

a logical channel identifier (LCID) code point for an uplink common control channel (UL CCCH);

a value in a UL-CCH1-MessageType within a UL-CCH1Message class;

a spare bit in a radio resource control (RRC) connection request message or an RRC connection resume request;

an identifier of the UE; or a value of a RRC information element;

transmit downlink control signaling that indicates whether the enhanced PUCCH frequency hopping pattern is configured; and receive the PUCCH with repetition and frequency hopping based on whether the enhanced PUCCH frequency hopping pattern is configured.

12. The apparatus of claim 11, wherein the enhanced PUCCH frequency hopping pattern includes intra-slot frequency hopping in every slot of the PUCCH with repetition.

13. The apparatus of claim 11, wherein the enhanced PUCCH frequency hopping pattern includes intra-slot frequency hopping in exactly one slot of the PUCCH with repetition.

14. The apparatus of claim 11, wherein the enhanced PUCCH frequency hopping pattern includes inter-slot frequency hopping between slots or time domain windows of the PUCCH with repetition.

15. The apparatus of claim 11, wherein to transmit the downlink control signaling that indicates whether the enhanced PUCCH frequency hopping pattern is configured, the one or more processors, individually or in combination, are configured to transmit one of:

a downlink control information (DCI) that schedules a random access message 4 and includes at least one bit that indicates configuration of the enhanced PUCCH frequency hopping pattern;

a DCI that schedules a random access message 2 and includes at least one bit that indicates configuration of the enhanced PUCCH frequency hopping pattern; or a random access message 2 that includes a random access response uplink grant with at least one bit that indicates configuration of the enhanced PUCCH frequency hopping pattern.

16. The apparatus of claim 11, wherein to receive the PUCCH with repetition and frequency hopping, the one or more processors, individually or in combination, are configured to:

determine a timing of multiple frequency hops based on the enhanced PUCCH frequency hopping pattern; and determine a frequency change for each hop based on index $r_{PUCCH}$.

17. A method of wireless communication at a user equipment (UE), comprising:

receiving an indication that a cell supports an enhanced physical uplink control channel (PUCCH) frequency hopping pattern for a PUCCH with repetition prior to dedicated PUCCH resource configuration;

indicating at least one of a capability or a request of the UE for the enhanced PUCCH frequency hopping pattern, wherein the indication of at least one of the capability or the request of the UE for the enhanced PUCCH frequency hopping pattern includes a random access message 3 with a field set to indicate the capability or the request of the UE for the enhanced PUCCH frequency hopping pattern, wherein the field is one of:

a logical channel identifier (LCID) code point for an uplink common control channel (UL CCCH);

a value in a UL-CCH1-MessageType within a UL-CCH1Message class;

a spare bit in a radio resource control (RRC) connection request message or an RRC connection resume request;

an identifier of the UE; or a value of a RRC information element;

receiving downlink control signaling that indicates whether the enhanced PUCCH frequency hopping pattern is configured; and transmitting the PUCCH with repetition and frequency hopping based on whether the enhanced PUCCH frequency hopping pattern is configured.

18. A method of wireless communication at a base station, comprising:

indicating that a cell supports an enhanced physical uplink control channel (PUCCH) frequency hopping pattern for a PUCCH with repetition prior to dedicated PUCCH resource configuration;

receiving an indication of at least one of a capability or a request of a user equipment (UE) for the enhanced PUCCH frequency hopping pattern, wherein the indication of at least one of the capability or the request of the UE for the enhanced PUCCH frequency hopping pattern includes a random access message 3 with a field set to indicate the capability or the request of the UE for the enhanced PUCCH frequency hopping pattern, wherein the field is one of:

a logical channel identifier (LCID) code point for an uplink common control channel (UL CCCH);

a value in a UL-CCH1-MessageType within a UL-CCH1Message class;

a spare bit in a radio resource control (RRC) connection request message or an RRC connection resume request;

an identifier of the UE; or a value of a RRC information element;

transmitting downlink control signaling that indicates whether the enhanced PUCCH frequency hopping pattern is configured; and receiving the PUCCH with repetition and frequency hopping based on whether the enhanced PUCCH frequency hopping pattern is configured.

* * * * *